US012675997B2

(12) United States Patent
Thorpe

(10) Patent No.: US 12,675,997 B2
(45) Date of Patent: Jul. 7, 2026

(54) DATA PROCESSING APPARATUS AND METHOD

(71) Applicants: Sony Group Corporation, Tokyo (JP); Sony Europe B.V., Surrey (GB)

(72) Inventor: Lachlan Thorpe, Bristol (GB)

(73) Assignees: SONY EUROPE BV, Surrey (GB); Sony Group Corporation, Tokyo (JP)

( * ) Notice: Subject to any disclaimer, the term of this patent is extended or adjusted under 35 U.S.C. 154(b) by 19 days.

(21) Appl. No.: 18/807,922

(22) Filed: Aug. 17, 2024

(65) Prior Publication Data

US 2025/0078506 A1 Mar. 6, 2025

(30) Foreign Application Priority Data

Sep. 4, 2023 (GB) ...................................... 2313449

(51) Int. Cl.
*G06V 20/40* (2022.01)
(52) U.S. Cl.
CPC .............. *G06V 20/42* (2022.01); *G06V 20/44* (2022.01)
(58) Field of Classification Search
CPC ........ G06V 20/42; G06V 20/44; G06V 20/52; G06V 10/82; G06N 3/045; G06N 3/0442
USPC ......................................................... 386/241
See application file for complete search history.

(56) References Cited

U.S. PATENT DOCUMENTS

2022/0184481 A1 6/2022 Tong
2023/0230376 A1 7/2023 Lunt

FOREIGN PATENT DOCUMENTS

JP 2019179459 A 10/2019
WO WO-2019188714 A1 * 10/2019 ............. G06N 20/00
WO 2023081456 A1 5/2023

OTHER PUBLICATIONS

English Translation of WO 2019188714 Oct. 2019 (Year: 2019).*
Memory Augmented Deep Generative Models for Forecasting the Next Shot Location in Tennis (Year: 2020).*
Search Report from corresponding GB Application No. 2313449.7, mailed on Mar. 6, 2024, 4 pages.
Pei, Yisheng et al., "Passing Heatmap Prediction Based on Transformer Model Using Tracking Data for Football Analytics," Sep. 2023, 13 pages.

(Continued)

*Primary Examiner* — Loi H Tran
(74) *Attorney, Agent, or Firm* — Tucker Ellis LLP

(57) ABSTRACT

A data processing apparatus includes circuitry that receives a sequence of data elements that indicate position of objects in a sports event at successive time steps; perform a prediction process using the data elements to predict a first predicted data element indicating predicted position of the objects at a first future time step; determine whether a break in the sports event is predicted to occur; if a break is not predicted to occur, continue performing the prediction process to predict a second predicted data element indicating predicted position of the objects at a second future time step; and if a break is predicted to occur: end the prediction process; use the first predicted data element to predict a third predicted data element indicating predicted position of the objects at a point at which the sports event is continued; and restart the prediction process using the third predicted data element.

13 Claims, 23 Drawing Sheets

(56)  References Cited

OTHER PUBLICATIONS

Fernando, Tharindu et al., "Memory Augmented Deep Generative Models for Forecasting the Next Shot Location in Tennis," IEEE Transactions on Knowledge and Data Engineering, vol. 32, No. 9, Sep. 2020, 13 pages.
Wei, Xinyu et al., "Forecasting the Next shot Location in Tennis Using Fine-Grained Spatiotemporal Tracking data," IEEE Transactions on knowledge and Data Engineering, vol. 28, No. 11, Nov. 2016, pp. 2988-2997.
Yue, Yisong et al., "Learning Fine-Grained Spatial Models for Dynamic Sports Play Prediction," IEEE International Conference on Data Mining, 2014, pp. 670-679.

* cited by examiner

Option 1
Training sequence
| p1 | q1 | b1 | p2 | q2 | b2 | p3 | q3 | b3 | p4 | q4 | b4 | p5 | q5 | b5 | p6 | q6 | b6 |
Target sequence
| p2 | q2 | b2 | p3 | q3 | b3 | p4 | q4 | b4 | p5 | q5 | b5 | p6 | q6 | b6 | p7 | q7 | b7 |
FIG. 5A
(i) Starting "real" data (t1->t2)
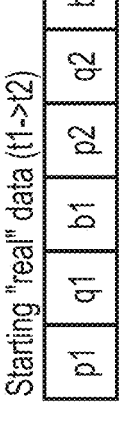
| p1 | q1 | b1 | p2 | q2 | b2 |
(ii) Predicted data (t2->t3)
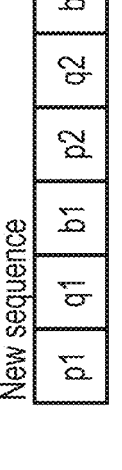
| p2' | q2' | b2' | p3' | q3' | b3' |
(iii) New sequence
| p1 | q1 | b1 | p2 | q2 | b2 | p3' | q3' | b3' |
FIG. 5B Option 2

Training sequence

| p1 | q1 | b1 | p2 | q2 | b2 | p3 | q3 | b3 | p4 | q4 | b4 | p5 | q5 | b5 | p6 | q6 | b6 |

Target sequence

| q1 | b1 | p2 | q2 | b2 | p3 | q3 | b3 | p4 | q4 | b4 | p5 | q5 | b5 | p6 | q6 | b6 | p7 |

Starting "real" data (t1→t2)

(i)

| p1 | q1 | b1 | p2 | q2 | b2 |

Predicted data (t2→t3)

(ii)

| q1' | b1' | p2' | q2' | b2' | p3' |

New sequence (iii)

| p1 | q1 | b1 | p2 | q2 | b2 | p3' |

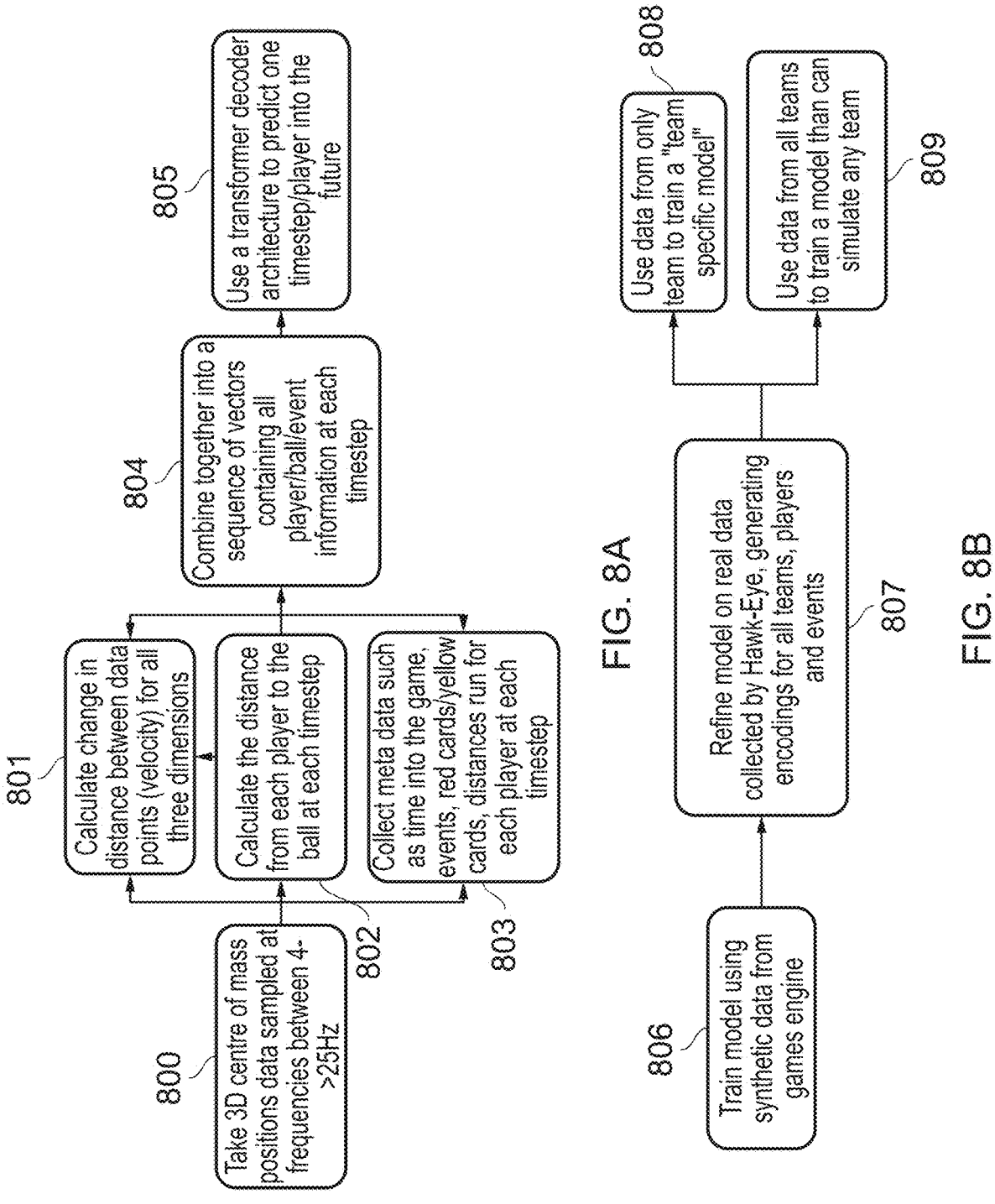

800 Take 3D centre of mass positions data sampled at frequencies between 4->25Hz 801 Calculate change in distance between data points (velocity) for all three dimensions 802 Calculate the distance from each player to the ball at each timestep 803 Collect meta data such as time into the game, events, red cards/yellow cards, distances run for each player at each timestep 804 Combine together into a sequence of vectors containing all player/ball/event information at each timestep 805 Use a transformer decoder architecture to predict one timestep/player into the future

FIG. 8A

806 Train model using synthetic data from games engine

807 Refine model on real data collected by Hawk-Eye, generating encodings for all teams, players and events 808 Use data from only team to train a "team specific model"

809 Use data from all teams to train a model than can simulate any team

FIG. 8B

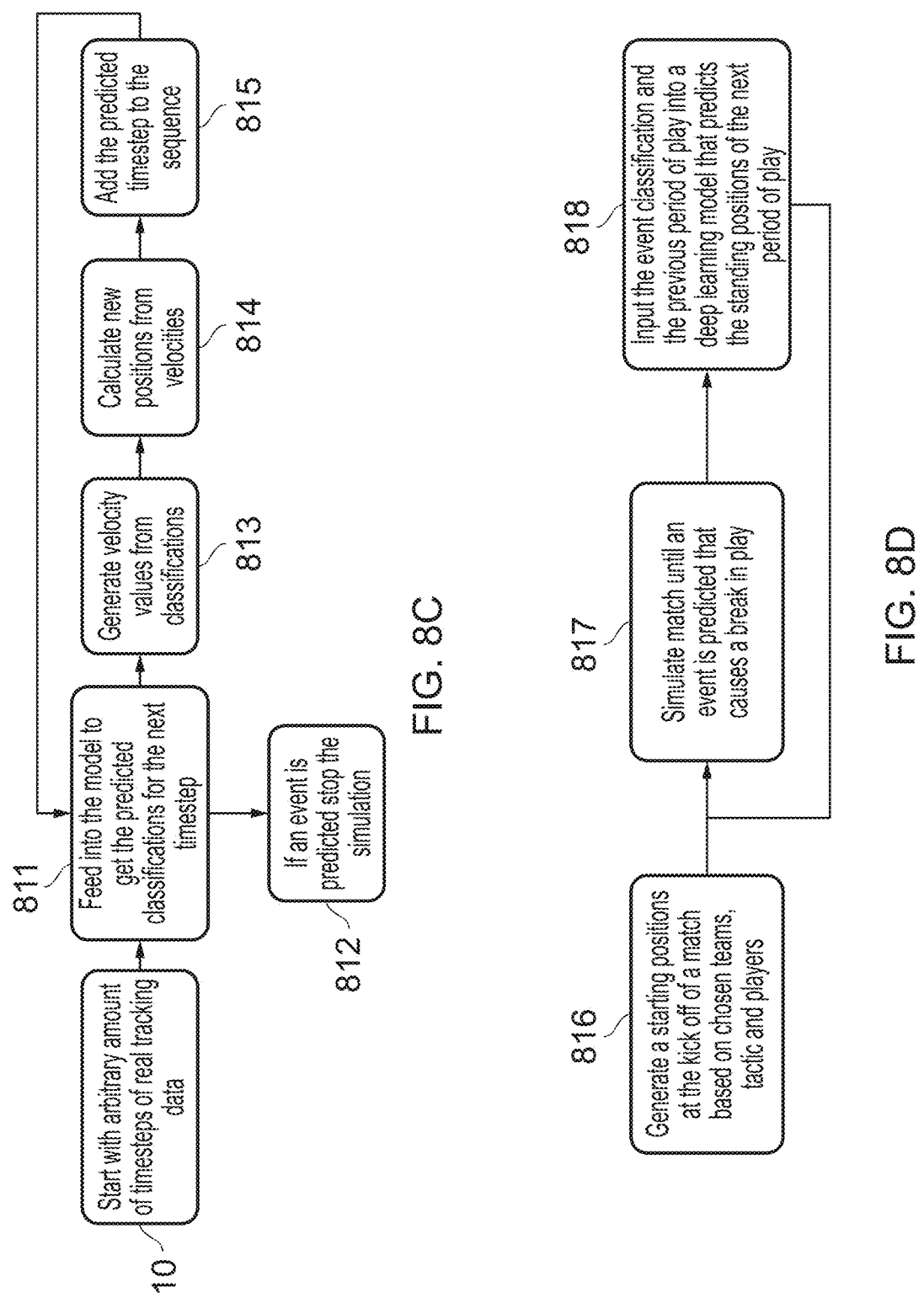

810  Start with arbitrary amount of timesteps of real tracking data

811  Feed into the model to get the predicted classifications for the next timestep 812  If an event is predicted stop the simulation 813  Generate velocity values from classifications 814  Calculate new positions from velocities 815  Add the predicted timestep to the sequence

FIG. 8C

816  Generate a starting positions at the kick off of a match based on chosen teams, tactic and players 817  Simulate match until an event is predicted that causes a break in play 818  Input the event classification and the previous period of play into a deep learning model that predicts the standing positions of the next period of play

FIG. 8D

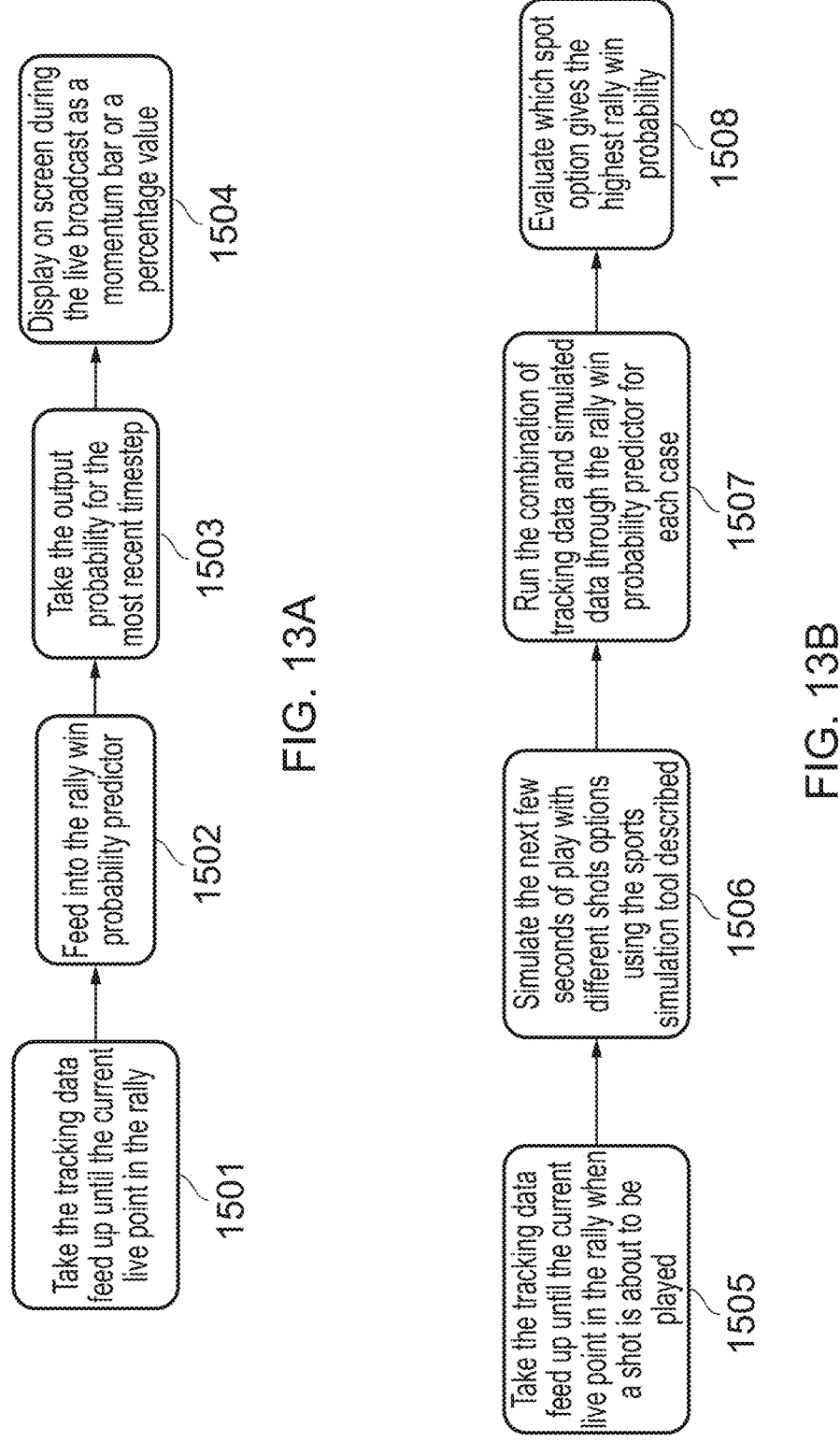

Take the tracking data feed up until the current live point in the rally

1501

Feed into the rally win probability predictor

1502

Take the output probability for the most recent timestep

1503

Display on screen during the live broadcast as a momentum bar or a percentage value

Take the tracking data feed up until the current live point in the rally when a shot is about to be played

1505

Simulate the next few seconds of play with different shots options using the sports simulation tool described

1506

Run the combination of tracking data and simulated data through the rally win probability predictor for each case

1507

Evaluate which spot option gives the highest rally win probability

1300 — Start

1301 — Receive first data elements

1302 — Receive adjustment information and/or second data elements

1303 — Generate adjusted sequence

1304 — Perform sequence prediction

1305 — End

DATA PROCESSING APPARATUS AND METHOD

CROSS REFERENCE TO RELATED APPLICATIONS

The present application claims priority to United Kingdom patent application 2313449.7 filed on Sep. 4, 2023, the contents of which being incorporated herein by reference in its entirety.

BACKGROUND

Field of the Disclosure

The present disclosure relates to a data processing apparatus and method.

Description of the Related Art

The "background" description provided is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

In sports analysis, it is often desirable to be able to predict the outcome of certain actions in a particular sport. For example, in soccer (football), it may be desirable to predict how likely it is for a player to score a goal at the instance at which they kick the ball. In another example, in tennis, it may be desirable to predict how likely it is for a player to win a point at the instance at which they strike the ball with a racket. Such predictions can be useful for a range of reasons, including sports broadcasting (e.g. real time or post-match analysis) or training (e.g. devising improved strategies based on recordings of past performance), for example. There is a desire to improve the power and accuracy of such predictions.

SUMMARY

The present disclosure is defined by the claims.

BRIEF DESCRIPTION OF THE DRAWINGS

Non-limiting embodiments and advantages of the present disclosure are explained with reference to the following detailed description taken in conjunction with the accompanying drawings, wherein:

FIGS. 5A and 5B schematically show an example sequence prediction technique using whole elements;

FIGS. 8A to 8I and 9A and 9B schematically show example use cases in soccer;

FIGS. 10A to 10D, 11A and 11B, 12, 13A and 13B and 14 schematically show example use cases in tennis;

Like reference numerals designate identical or corresponding parts throughout the drawings.

DETAILED DESCRIPTION OF THE EMBODIMENTS

Figure 1:
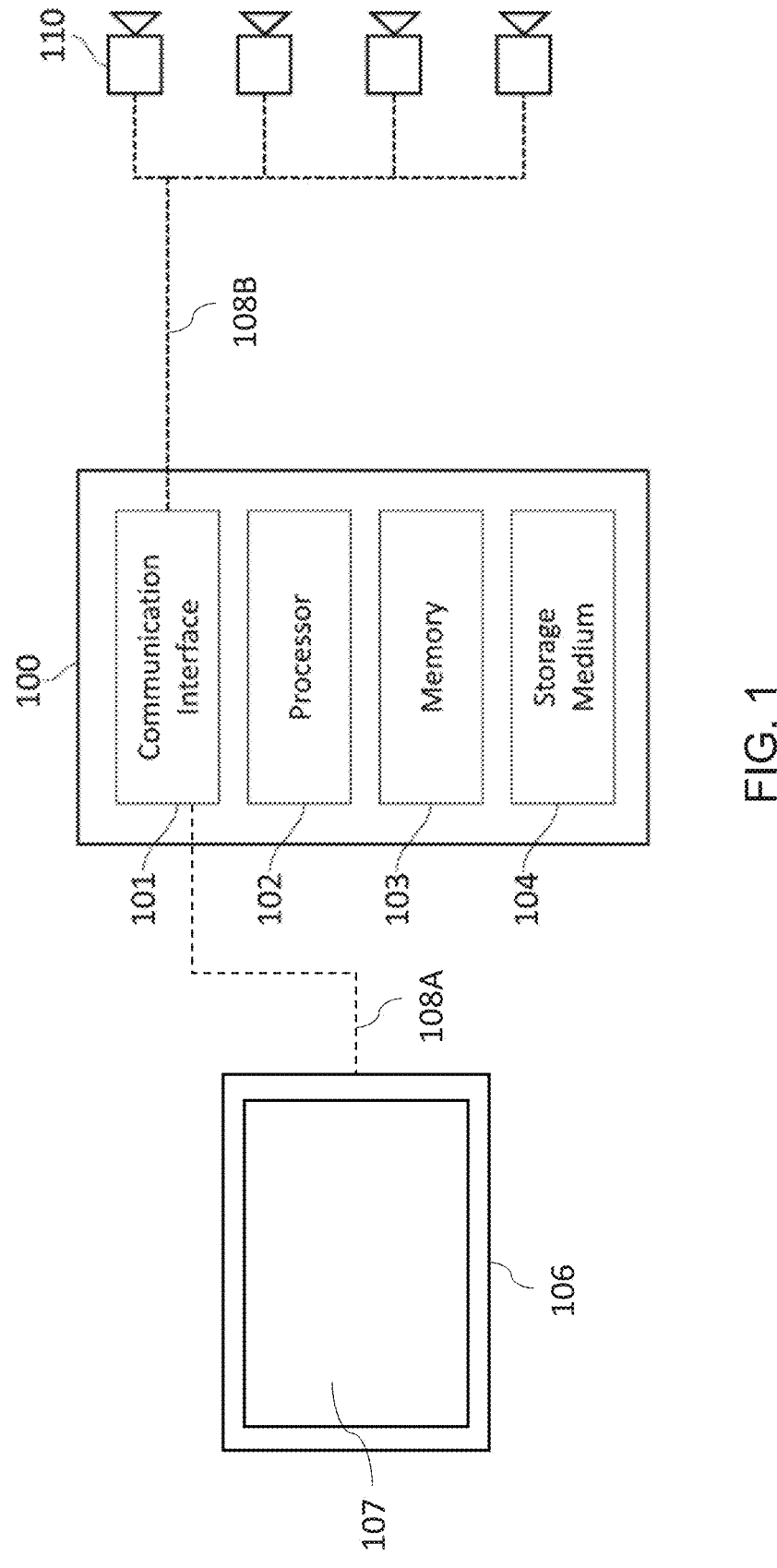
FIG. 1 schematically shows an example data processing apparatus.

FIG. 1 shows an example data processing apparatus/device 100. It comprises a communication interface 101 for sending electronic information to and/or receiving electronic information from one or more other apparatuses, a processor 102 for executing electronic instructions, a memory 103 for storing the electronic instructions to be executed and electronic input and output information associated with the electronic instructions and a storage medium 104 (e.g. a solid state drive) for long term storage of digital information. Each of the communication interface 101, processor 102, memory 103 and storage medium 104 are implemented using appropriate circuitry, for example. The processor 102 controls the operation of each of the communication interface 101, memory 103 and storage medium 104.

The communication interface 101 is connected, via wired or wireless connection 108A, to a user interface 106 for receiving commands from and/or outputting information to a user. The user interface may comprise a touch screen, non-touch screen, buttons, a keyboard and/or a mouse, for example. In this example, the user interface comprises a touch screen 107 (such as a capacitive touch screen).

The communication interface 101 is also connected, via wired or wireless connection 108B, to one or more cameras 110. The one or more cameras 110 are configured to capture still and/or video images of a sports event such as a soccer or tennis match (game) to enable tracking of objects (such as players and a ball) in the sports event by the processor 102. Any suitable object tracking method known in the art may be used, such as one or more of those developed by Hawk-Eye® Innovations Limited.

The device 100, user interface 106 and one or more cameras 110 may be located at the same location or at least one of them may be located at a different location. For example, the one or more cameras 110 may be at the physical location of the sports event to capture images of the sports event, the user interface 106 may be located in a control room in a television studio and the device 100 may be located at a data centre.

Figure 2:
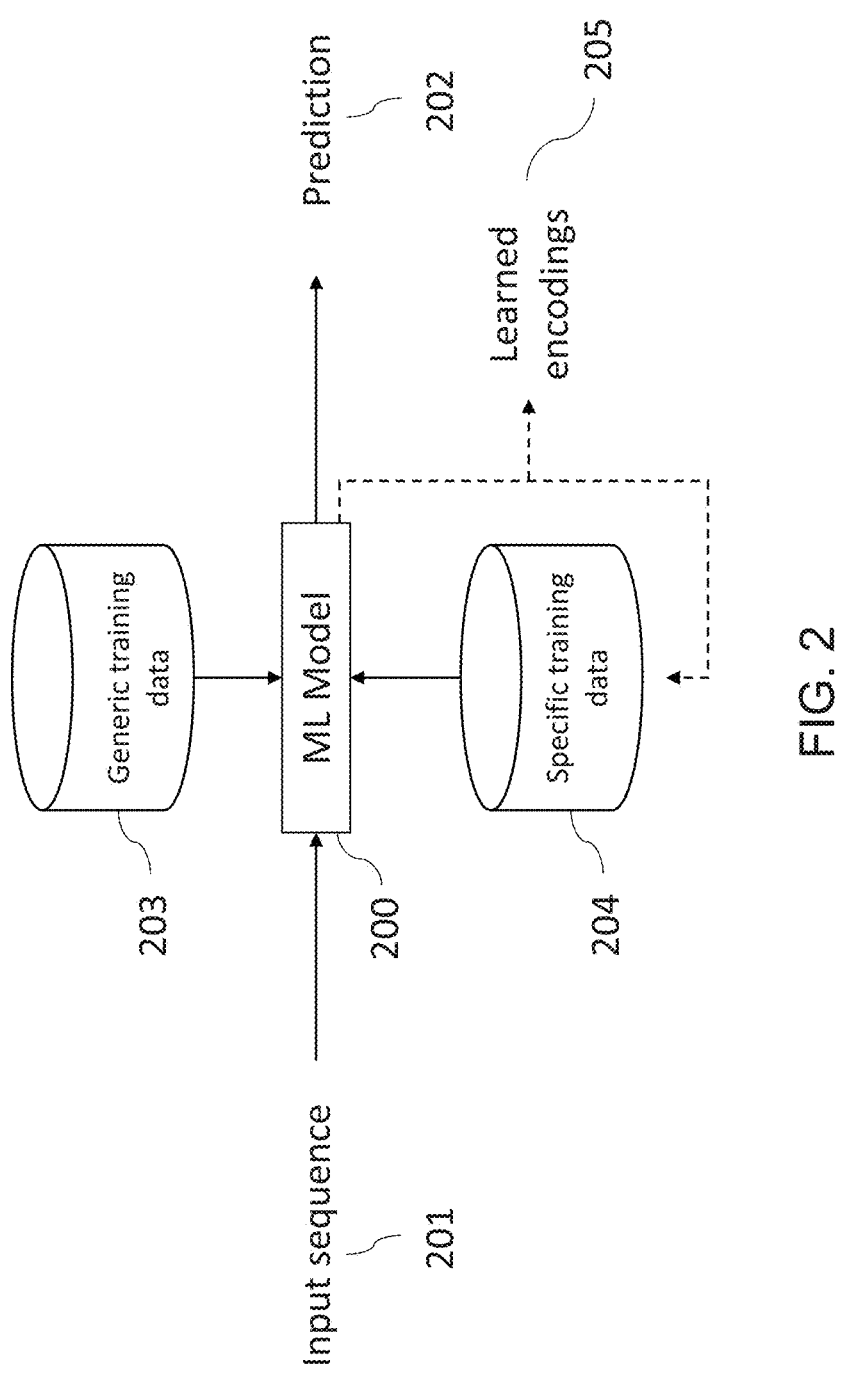
FIG. 2 schematically shows an example sequence-prediction machine learning model.

FIG. 2 demonstrates an example machine learning model 200 executed by the processor 102 of the device 100. In this example, the machine learning (ML) model 200 comprises a known type of machine learning model known as a transformer (using the known transformer decoder architecture). It will be appreciated, however, that other types of sequence-prediction models may be used, such as a recurrent neural network (RNN), in particular, a long short-term memory network (LSTM). The ML model is trained using generic training data 203 and/or specific training data 204 (both types of training data being stored in the storage medium 104, for example). Examples of generic training data 203 and specific training data 204 are given later.

Once trained, the ML model 200 is able to take an input sequence of data 201 (the input sequence being instances of data, also known as tokens, each corresponding to a time step—for example, each time step corresponding to 3 tokens) and generate a prediction 202 of a next instance of data in the sequence.

Training of the ML model 200 using the specific training data 204 also generates learned encodings 205, each learned encoding being a vector indicative of certain characteristic(s) of the input data. Such encodings are learned by the ML model 200 as it is trained and the learned encodings can then be used with subsequent input data to represent the characteristic concerned. For example, for soccer, for input data corresponding to a particular player on the pitch, an encoding may identify the particular soccer player and the particular team they play for. For tennis, for input data corresponding to a particular player on the court, an encoding may identifier the particular tennis player. This can help improve the accuracy of the prediction 200.

The present technique uses the trained ML model 200 to predict the behaviour of real sports players and create realistic simulations of gameplay.

The ML model 200 is trained on data collected by object tracking (for example, the tracking over time of the position of each player and the position of the ball in a soccer or tennis match using the one or more cameras 110) and/or on artificially generated object tracking data (such as that generated by a games engine of a soccer or tennis simulation video game). In an example, the generic training data 203 is artificially generated object tracking data and the specific training data 204 is collected object tracking data of players in real sports events. This increases the amount of data available for training the ML model 200 while enabling the specific characteristics of individual players (and teams, in the case of the example of soccer) to be taken into account by the ML model 200.

In an example, the ML model is trained using a total of at least 25,000 hours of object tracking data captured at between 4 and 50 Hz (or, more particularly, between 4 and 25 Hz or, more particularly, 20 Hz). 95% of the object tracking data (so, for example, at least 23,750 hours object tracking data) may be generic training data (e.g. based on a suitable games engine) and 5% of the object tracking data (so, for example, at least 1,250 hours of object tracking data) may be specific training data (e.g. based on tracking data collected during real sports events).

The ML model is thus trained using two separate training processes. There is a first, initial, training process using the generic training data (starting with the untrained ML model). There is then a second, refinement, training process using the specific training data (starting with the ML model which has been pre-trained with the generic training data). The first training process allows basic training of the model to be completed without the need for a large amount of real data from real sports events (which may not be available). The second training process then allows the model to be specialised (by transfer learning) to model real player(s) (using a relatively small amount of real data collected for those player(s)).

Each discrete time step of the data is treated as an individual element of the data sequence, and the ML model 200 predicts the state of the game at the next time step. The ML model 200 may also predict a distribution of possible outcomes, allowing for a range of possible use cases that involve generating alternate realities or outcome probabilities.

Figures 3A, 3B:
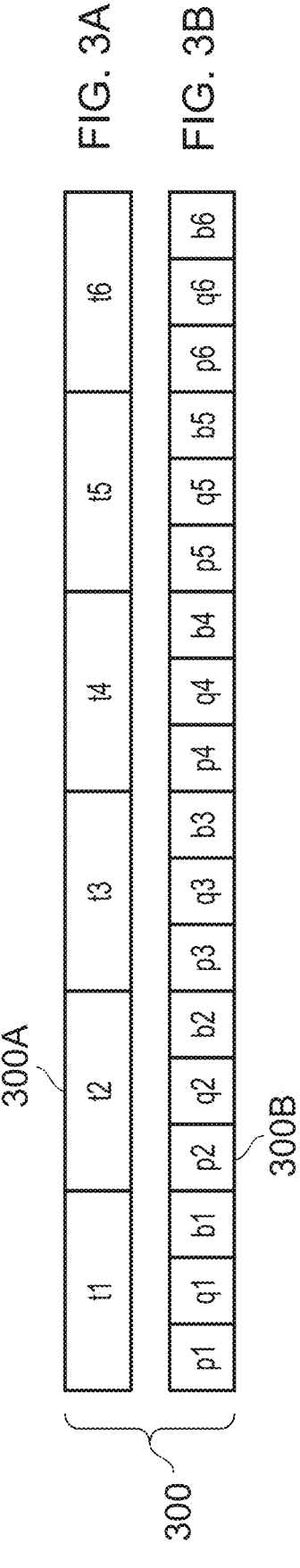
FIGS. 3A and 3B schematically shows example elements and sub-elements of a sequence.

FIGS. 3A and 3B show an example data sequence 300. This example is for a tennis match. The data is formatted so that object tracking data (e.g. positions and/or velocities) is sampled at a range of 4 to 50 Hz (or, more particularly, between 4 and 25 Hz or, more particularly, 20 Hz), for example. The data is treated as a sequence where each sample is an element 300A in the sequence. The sequence length may vary depending on the sport. In one example, the sequence length corresponds to 5 seconds of data. Within each element of the sequence, the element is further subdivided into sub-elements 300B associated with the individual player information and the information for the ball. A sequence of 10 time steps of data describing two tennis players and a ball therefore becomes a sequence of 10 elements 300A and 30 sub-elements 300B (with 3 sub-elements 300B per element 300A). In another example of soccer, for example, there will be 23 sub-elements 300B per element 300A (one sub-element for each of the 22 players on the pitch and 1 sub-element for the ball).

As illustrated in FIG. 3A, each element 300A is associated with a respective successive time step (t1, t2, t3, t4, t5 and t6 or, more generally, ti for the ith element). As illustrated in FIG. 3B, each element 300A of FIG. 3A is divided into three sub-elements 300B (so sub-elements (p1, q1, b1) for the element at t1, sub-elements (p2, q2, b2) for the element at t2, etc., or, more generally, sub-elements (pi, qi, bi) for the ith element). The sub-element pi represents tracking data of the first player, the sub-element qi represents tracking data of the second player and the sub-element bi represents tracking data of the ball.

Each sub-element (pi, qi, bi) is a vector of properties describing the state of the relevant object. For example, each sub-element vector contains the (x, y, z) coordinates (e.g. in metres) indicating the absolute position of the object (e.g. the coordinates of the centre of mass (COM) of the object) in a pre-calibrated spatial model of the tennis court at the time ti, the velocities in the (x, y, z) directions of the object at time ti (the velocities at time ti being defined, for example, as the change in position $(\delta x, \delta y, \delta z)$ with respect to the positions (x, y, z) at time ti−1, given that the period of time between each time step is fixed) and the distances (dx, dy, dz) in the (x, y, z) directions from the ball object. For the ball sub-element bi, (dx, dy, dz) is set as (0, 0, 0). The components $(x, y, z, \delta x, \delta y, \delta z, dx, dy, dz)$ thus form a vector. This will be referred to as the positional vector.

The sub-element vector for each player at each time step may also contain identification information as to the identity of the player and, in the case of team sports such as soccer, the identity of the team. This player and/or team identification information may be represented using a predefined encoding or an encoding learned (as one of the learned encodings 205) during the training of the ML model 200 using the specific training data 204, for example. The encoding, whether predefined or learned, takes the form of another vector (which will be referred to as the identification vector) which is appended to the positional vector.

The sub-element vector for at least one of the players and/or ball may also include any suitable metadata such as, for example, the elapsed time since the start of the game, any context data about the game (e.g. data indicating whether the game is a friendly, national competition game or international competition game) and/or game statistics. Game statistics may include, for example, how far a particular player has travelled during the game so far and/or any disciplinary action taken against a player in the current game so far and/or in one or more previous games (e.g. yellow or red cards given in soccer). The metadata takes the form of another vector (which will be referred to as the metadata vector) which is further appended to the combined positional and identification vectors to form the sub-element vector.

The metadata vector may, again, take the form of a pre-defined or learned encoding vector (that is, one of the learned encodings 205).

Thus, for example, each sub-element vector is an n-dimensional vector where n=p+e+m, where p is the dimensionality of the positional vector (in this example, p=9), e is the dimensionality of the identification vector and m is the dimensionality of the metadata vector. A vector representing an entire element 300A (rather than a sub-element 300B), which may be referred to as an element vector, may be generated by concatenating each sub-element vector of that element to generate a vector of dimensionality X*n, where X is the number of sub-elements in an element. Thus, in the example of FIGS. 3A and 3B, X=3 and the dimensionality of the element vector representing each element 300A is 3*n.

In an example, a zero may be used for any value of the metadata vector of the sub-element vector bi of the ball if that value is not relevant to the ball (for example, if that value indicates the number of yellow or red cards awarded to a particular player).

Once the ML model 200 has been trained and, if applicable, the various encodings (identifying each specific player, team, etc. as appropriate) have been learned, the sequence 300 can be input (as the input sequence 201) to the ML model 200 to enable the next element 300A (or sub-element 300B) in the sequence to be predicted (as the prediction 202).

In an example, each sub-element vector of the sequence 300 is considered to be a token of the transformer of the ML model 200 and the sequence of sub-element vectors representing the sequence is provided as the input sequence 201. The transformer then converts the input sequence of vectors into a sequence of embeddings and passes the embeddings into a multi head attention mechanism. The ML model 200 also comprises a classifier (trained using a cross entropy loss, for example) which uses a feed forward layer to convert the output of the multi head attention mechanism of the transformer to a classification output indicating a change in position of each of the relevant tracked object(s) (one object in the case of prediction of the next sub-element 300B, multiple objects, e.g. 3, in the case of prediction of the next element 300A) at the next time step.

Figure 4:
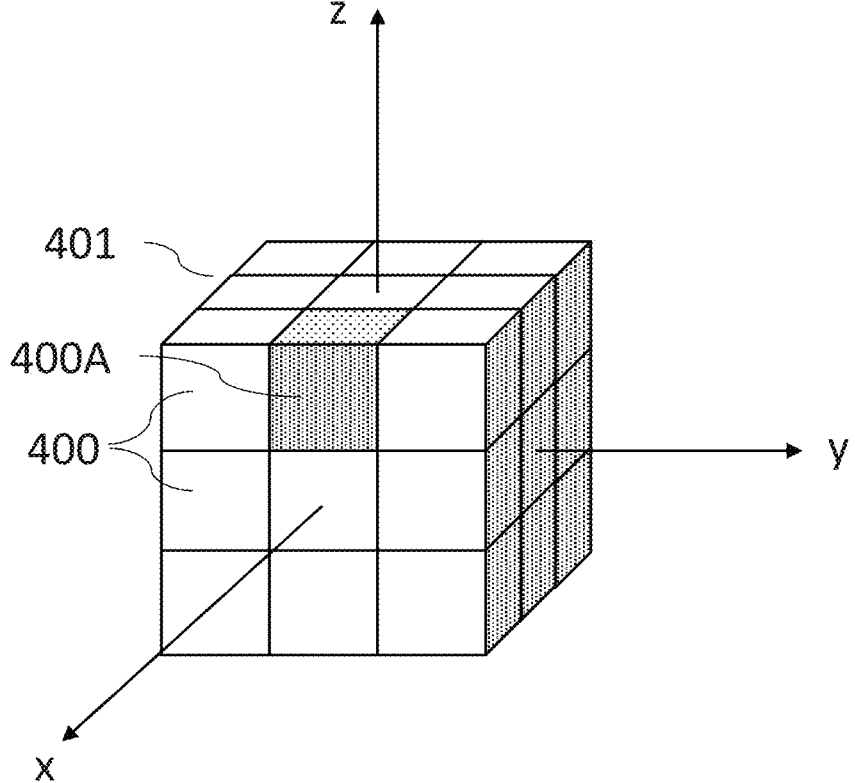
FIG. 4 schematically shows an example of classification using a constrained cube.

The change in position of the object is classified as one of a plurality of discrete cubic bins distributed about a point (0, 0, 0) in (x, y, z) space. This is exemplified in FIG. 4. In this example, there are 27 cubic bins 400 (corresponding to 27 possible classifications) which, together, form a larger cube 401 centred at (0, 0, 0) and extending a predetermined distance in each of the positive and negative x, y and z directions (for example, between −1 m and +1 m in each of the x, y and z directions). The specific cubic bin classification for the object then indicates the direction in which that object is predicted to move at the next time step with respect to that object's position at the previous time step. In the example of FIG. 4, the cubic bin classification for the object is cubic bin 400A, indicating predicted movement in a positive direction of the x and z axes in the x-z plane.

For a larger number of cubic bins (27 cubic bins being shown here for simplicity), the cubic bin classification of an object may also indicate a range in the amount of movement predicted for the object in each of the x, y and z directions with respect to the object's position at the previous time step. For instance, for 64 cubic bins, the object's predicted movement in each of the x, y and z directions can take one of 4 values. For a large cube 401 extending between −1 m and +1 m, the amount of movement of the object can therefore be predicted in increments of 0.5 m. For 125 cubic bins, the object's predicted movement in each of the x, y and z directions can take one of 5 values. For a large cube 401 extending between −1 m and +1 m, the amount of movement of the object can therefore be predicted in increments of 0.4 m.

To identify the cubic bin classification for a given prediction, the classifier of the ML model 200 converts the output of the transformer ML model 200 using a sigmoid function into probabilities that the object concerned (e.g. player or ball) moves to a certain cubic bin. The method of sampling from this distribution is either "top k" or "nucleus" sampling, for example. These methods find the few cubic bins (e.g. a predetermined number of cubic bins) with the highest probabilities, renormalize the probabilities across these bins and then randomly sample from this new distribution. This results in non-deterministic predictions but, averaged over a series of many predictions, the most probable outcome given the same initial conditions (these being the preceding sub-elements of the sequence) will be most prevalent.

Once a cubic bin has been selected, the x, y and z coordinates of that bin are determined. In an example, these coordinates describe a bin in a discretised and normalized space between −1 and 1. The values of the centre of the bin are taken and some uniform noise is added so that a final continuous value of each of x, y and z can be anywhere within the range of the bin. These values are then scaled (if necessary, e.g. if the large cube 401 corresponds to a range different to −1 m to +1 m in each of the x, y and z directions) to generate the ($\delta$x, $\delta$y, $\delta$z) values. As previously explained, the ($\delta$x, $\delta$y, $\delta$z) values represent the velocity of the object at the predicted time step. They can also be added to the (x, y, z) values of the object at the preceding time step to generate predicted (x, y, z) values of the object at the predicted time step. This allows final generation of the prediction 202 of the next element (pi, qi, bi) output by the ML model 200.

FIGS. 5A and 5B show a first example of training and using the ML model 200.

As illustrated in FIG. 5A, the model is trained to predict the whole next element 300A (rather than just a sub-element 300B) of the next time step. The attention mask of the transformer is set so that each token (sub-element) can see every other token (sub-element) within the current time step and previous time steps. That is, token pi can see all of pj, qj and bj (where j<i) as well as qi and bi.

As illustrated in FIG. 5B, the trained model can then be used to predict the next whole next element 300A using at least one element 300A of real data as the starting point. In FIG. 5B, two consecutive elements 300A representing real data at time steps t1 and t2 are used as the input sequence 201. This is shown in FIG. 5B (i). The ML model 200 then generates a predicted sequence for time steps t2 and t3. This is shown in FIG. 5B (ii). The element of the predicted sequence corresponding to t3 is then output as the prediction 202. The full sequence (including the real data of t1 and t2 together with the predicted data of t3) is shown in FIG. 5B (iii). This process is then repeated to predict further new elements 300A, thereby generating a prediction sequence which successively grows in length with each new predicted element 300A predicting the motion of the objects.

Thus, in FIG. 5B, the sub-elements of the predicted data element (p3', q3', b3') are predicted using only data elements of one or more previous time steps (i.e. (p1, q1, b1) and (p2, q2, b2)).

Figures 6A, 6B:
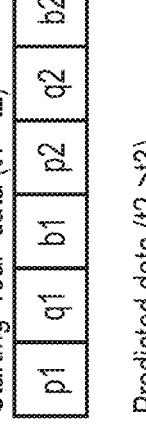
FIGS. 6A and 6B schematically show an example sequence prediction technique using sub-elements.

FIGS. 6A and 6B show a second example of training and using the ML model 200.

As illustrated in FIG. 6A, the model is trained to predict only the next sub-element 300B (rather than the whole next element 300A) of the next (or current) time step. The attention mask of the transformer is set so that each token (sub-element) can see every other token (sub-element) in the previous time steps but future tokens in the sequence at the current time step are masked. That is, token pi can see all of pj, qj and bj (where j<i) but cannot see qi or bi (since, although qi and bi are in the same time step as pi, they occur after pi in the sequence). Token qi can see all of pj, qj and bj (where j<i) and pi but cannot see bi (since, although bi is in the same time step as qi, it occurs after qi in the sequence). Finally, token bi can see all of pj, qj and bj (where j<i) as well as pi and qi (since both pi and qi occur before bi at the ith time step in the sequence). This may be referred to as auto-regressive training and allows the prediction of a sub-element using other sub-elements in the same time step (as long as those other sub-elements occur before the predicted sub-element in the sequence).

As illustrated in FIG. 6B, the trained model can then be used to predict the next sub-element 300B using at least one sub-element 300B of real data as the starting point. In FIG. 6B (as in FIG. 5B), two consecutive elements 300A (corresponding to 6 consecutive sub-elements 300B) representing real data at time steps t1 and t2 are used as the input sequence 201. This is shown in FIG. 6B (i). The ML model 200 then generates a predicted sequence for time steps t1, t2 and t3. This is shown in FIG. 6B (ii). Compared to FIG. 5B (ii), it can be seen that the prediction only includes the next sub-element p3' of the next time step t3, not the entire element (p3', q3', b3') of the next time step t3. The next sub-element p3' of the predicted sequence corresponding to t3 is then output as the prediction 202. The full sequence (including the real data of t1 and t2 together with predicted data of t3) is shown in FIG. 6B (iii). This process is then repeated to predict further new sub-elements 300B, thereby generating a prediction sequence which successively grows in length with each new predicted sub-element 300B predicting the motion of the relevant object.

Thus, in FIG. 6B, at least one sub-element of the predicted data element is predicted using at least one already-predicted sub-element at a current time step. So, for example, prediction of sub-element q3' (not shown in FIG. 6B) may take into account already-predicted sub-element p3' and prediction of sub-element b3' (not shown in FIG. 6B) may take into account already-predicted sub-elements p3' and/or q3. Since the prediction of each predicted sub-element 300B takes into account not only sub-elements of the previous time step(s) but also any sub-elements previously predicted for the current time step, the accuracy of the prediction may be improved.

To generate the learned encodings 205, the ML model 200 starts with randomised values for each encoding. As data comes into the ML model 200 during training, these randomised values are then updated with the relevant values learned by the ML model 200.

Thus, for example, during the initial training of the ML model 200 (using the generic training data), all identification vectors of the generic training data comprise the same default encoding for all players. Alternatively, no identification vector is used during the initial training with generic training data (so the initial training takes place using only the positional vectors for each player, for example). The weights of the ML model 200 are therefore determined based on the generic training data.

Then, during the subsequent refinement training (using the specific training data), identification vectors comprising randomised encodings are initially allocated for each player (and a corresponding identification vector, e.g. with a learned encoding, is added for the ball). Before data is input into the model, the relevant identification vectors for the players in the data are appended to the start of each sub element (so, for example, each sub-element vector now comprises a positional vector and an identification vector). As the weights of the ML model are refined, the encodings of the identification vectors are included in the refinement process. Once converged, these values form the learned encodings 205 for each player and are used in the subsequent prediction process using the trained ML model.

In an example, the learned encodings are stored as part of the ML model 200 and each real player is uniquely associated with a numerical value which can be used to look up the player encoding. For example, the learned encodings are stored in a matrix and each player is uniquely associated with a number indicating a column (or row) of that matrix defining the player encoding. The values of the matrix are determined during the refinement training of the model. When the model is used, the positional (and, if present, metadata) vector of each player is input to the ML model 200 with the numerical value associated with that player. The ML model 200 uses the input numerical value to lookup the encoding for that player and add it, as the identification vector, to the positional (and, if present, metadata) vector to form the complete sub-element for that player. The complete sub-element is then used in the sequence prediction of the ML model 200 to predict the next sub-element(s).

Using learned encodings 205 allows the ML model 200 to optimise how information is encoded and also enables a number of use cases, examples of which are described later.

In an example, an entire sports event (e.g. an entire soccer or tennis match) may be simulated using the present technique. In this case, the size of the input sequence 201 is successively increased until it reaches its maximum possible length (the maximum possible length depending on the architecture of the ML model 200 and/or available processing power, for example). In another example, a new simulation is initiated for individual periods of play (e.g. at the start of each new rally in tennis or at the start of each new period when the ball is in play during soccer).

In an example, once the size of the input sequence 201 has grown to its maximum possible length, the simulation continues with the input sequence at its maximum length as a rolling window of data. Thus, for example, if the maximum length of the input sequence 201 is 5 seconds then, for the first 5 seconds of prediction, the length of the input sequence will successively grow. Then, for subsequent prediction, the elements/sub-elements at the beginning of the input sequence 201 are cut off and the latest 5 seconds of data forms the input sequence 201. Thus, in other words, the input sequence 201 represents the latest 5 seconds of data (or, more generally, the maximum length of the input sequence 201, e.g. 3, 7 or 10 seconds) in a rolling time window. This allows the prediction of the next element/sub-element to be based on the most recent available data (thereby improving the reliability of prediction) while also taking into account the fact that the ML model 200 has a maximum amount of data it can process at any one time.

Event Classification to Determine Breaks in the Prediction Sequence

Along with the prediction of where players and the ball are going to move, the ML model 200 may also predict events in the game. This includes the classification of types of shot in games such as soccer or tennis. For example, in soccer, this may be a prediction, at each time step, of an occurrence of an event such as a goal, corner, throw in, free kick or the like. In tennis, this may be a prediction, at each time step, of whether the current shot is an error (where a player hits the ball in the net or out of the court, for example) or winner (where a player successfully hits the ball over the net while keeping it in the court and the other player does not manage to successfully return it).

To predict events, an extra token (corresponding to a sub-element, for example) is added in the sequence to each time step. Thus, for example, a tennis match would have 4 tokens per time step instead of the 3 exemplified in FIG. 3B and a soccer match would have 24 tokens instead of 23 (one for each of the 22 players on the field and one for the ball). Each element 300A of the tennis sequence thus takes the form (pi, qi, bi, si), where si is a new sub-element 300B in the form of a vector indicating an event. This may be referred to as an event vector. The sub-element si includes a predetermined or learned event encoding and an extra prediction head is added to the transformer of the ML model 200 to classify events in the sequence (in particular, to classify whether the event indicates a break in play or not). Thus, if the event vector of the next predicted element 300A corresponds to an event which indicates a break in play (e.g. a "winner" or "error" in tennis or a "goal" or "throw in" in soccer), this will be classified as an event indicating a break in play by the ML model 200. This allows the sequence prediction processing of the ML model 200 to be controlled to stop as soon as an event is classified as indicating a break in play (that is, a break event).

As with the previously-described identification vector and metadata vector, the event vector may use predefined or learned encodings (forming part of the learned encodings 205) to identify each possible event. For example, for tennis, there may be a respective learned encoding for each of no event, a winner event or an error event (all event types other than the "no event" type being classified as a break event by the ML model 200). For soccer, there may be a respective learned encoding for each of no event, goal, corner, throw in, free kick, and so on (again, with all event types other than the "no event" type being classified as a break event by the ML model 200).

The prediction of a break event implies a prediction of the end of the current period of play. In an example, this indicates the end of the sequence prediction process. A new sequence prediction process is then started at the beginning of the next period of play.

For example, in soccer, the prediction of an event, at a given time step, such as a goal, corner kick, goal kick, throw in, free kick, penalty kick or offside call indicates the end of the current period of play. Such an event is classified as a break event by the ML model and causes the prediction of new elements in the current sequence to be ended. In tennis, the prediction of the current shot being an error or winner indicates the end of the current period of play (that is, the end of the rally). Detection of such an error or winner event is classified as a break event by the ML model and causes the prediction of new elements in the current sequence to be ended.

In the event that a predicted element with a sub-element si is classified as an event which ends the current period of play, the prediction is stopped. Prediction can then be restarted using one or more elements 300A indicating the positions of the players and ball at the start of the next period of play.

The one or more elements 300A which begin the prediction sequence of a new period of play may themselves be predicted by another ML model based on one or more of the element(s) 300A of the previous period of play and the classified event which led to the prediction sequence of the previous period of play being ended. This is exemplified in FIGS. 7A to 7D.

Figures 7A, 7B, 7C, 7D:
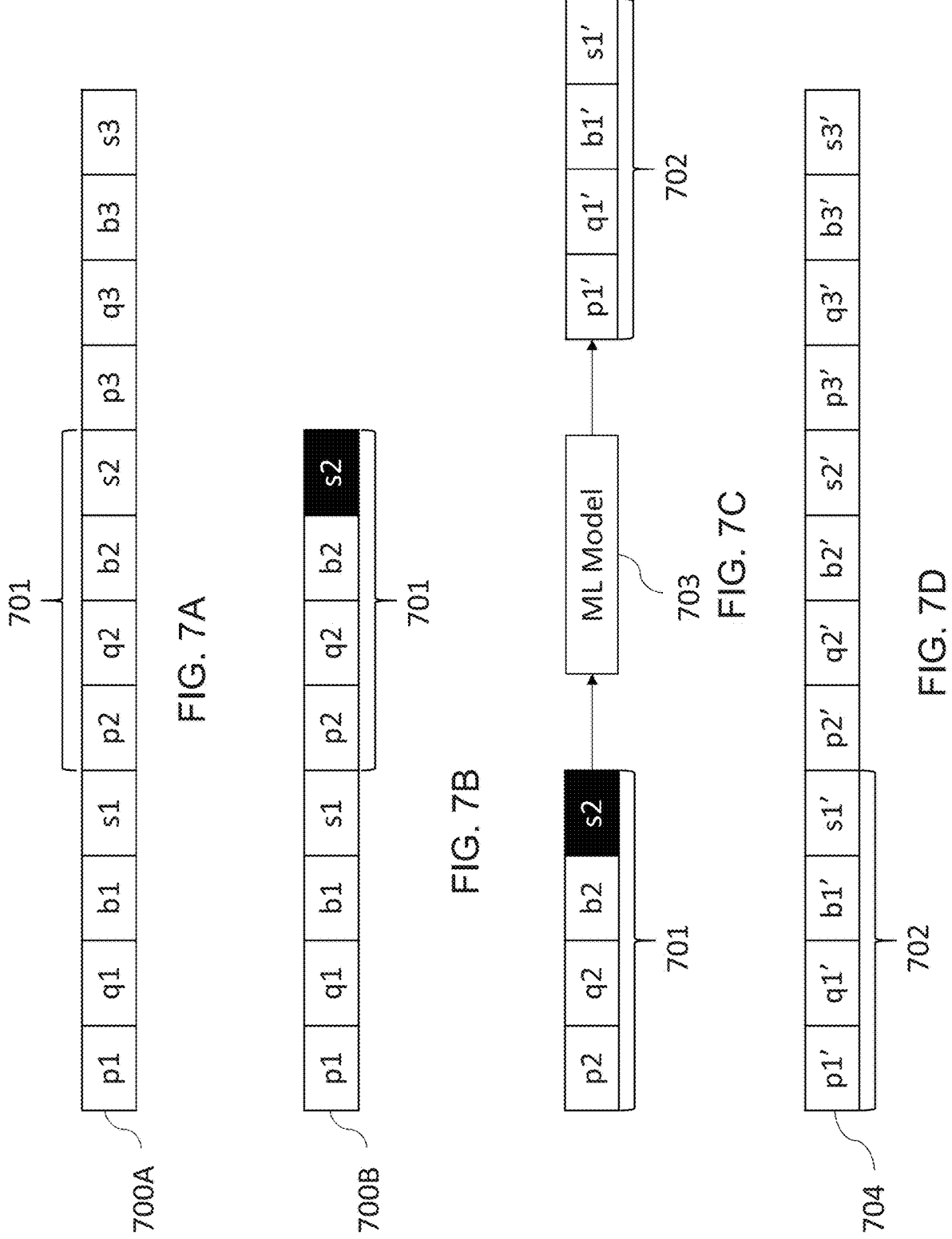
FIGS. 7A to 7D schematically show an example of the continuation or restarting of sequence prediction based on event detection.

FIGS. 7A and 7B show two possible occurrences for the same prediction sequence.

In the version 700A of FIG. 7A, the event classification sub-element "s2" of the element 701 does not indicate an event ending the current period of play (that is, a break event) is predicted. The prediction of the next element using ML model 200 therefore continues as previously described.

On the other hand, in the version 700B FIG. 7B, the event classification sub-element "s2" of the element 701 does indicate a break event (e.g. a "winner" or "error" shot) ending the current period of play is predicted. The prediction sequence is therefore stopped at element 701.

As shown in FIG. 7C, to restart the prediction sequence at the beginning of the next period of play, the element 701 is input to another ML learning model 703 to generate a predicted first element 702 of the prediction sequence of the next period of play. That is, based on the positions of the first player (p2), second player (q2) and ball (b2) at the end of the previous period of play and the event indicated by s2 which caused the previous period of play to end (e.g. one of the players scoring a winning shot or making an error), the ML model 703 predicts the element 702. As shown in FIG. 7D, the prediction sequence 704 for the next period of play is then generated by the ML model 200 in the way previously described starting from the predicted element 702. Successive predictions of the prediction sequence 704 are continued until, once again, the end of the period of play is predicted.

Like the ML model 200, the ML model 703 is executed by the processor 102 of the device 100 and comprises a transformer (using the known transformer decoder architecture). Another type of sequence-prediction model (such as an RNN, in particular, LSTM), may be used, however. The ML model 703 is once again trained using generic training data and/or specific training data (both types of training data being stored in the storage medium 104, for example). For example, the same training data as used to train the ML model 200 may be used. During the training, however, rather than being trained to predict the known or sub-element(s) of a training sequence at the next time step (as with ML model 200), the ML model 703 is trained to predict the known starting positions of each object at the start of a new period of play using the known end positions of each object at the end of the previous period of play (together with the known classification of the event when caused the end of the previous period of play). This allows the ML model to generate a predicted first element 702 of the prediction sequence of the new period of play, as exemplified in FIG. 7C.

Additional information may also be used in generating the first predicted element 702. For example, metadata (e.g. included in the metadata vector of one or more of the sub-elements of element 701) such as the score or any relevant data from earlier in the sports event may be used in the prediction.

The ML model 703 may also be trained to take into account multiple elements 701 of the previous period of play in predicting the first element 702 of the new period of play. For example, rather than predicting element 702 based only on the element 701, it may also take into account one or more of the elements preceding element 701 in the prediction sequence of the previous period of play. In particular, all data elements in the rolling time window of the prediction sequence at the end of the previous period of play may be used to predict the first element 702 of the new period of play.

Thus, in an example where the sports event is a soccer match, if a break in play is predicted by element 701 because the ball goes out for a thrown in, the current sequence ends. The predicted first element 702 of the next sequence is then predicted using ML model 703. The element 702 will indicate the predicted the position of the ball and players at the instant that the ball is thrown in and play is resumed.

By restarting the generation of the prediction sequence for each new period of play in the way described, the stability of the predictions of the ML model 200 is improved and the amount of processing required for implementing the prediction at each time step can be more efficiently managed (compared to using all available previous time steps even after a break in play, for example).

In general, prediction can be paused when, for example, a break in the current period of play has been predicted (in which case, the prediction sequence will subsequently be restarted based on the predicted new first element 702) or at any other time. A user may control the pausing and resumption of prediction via suitable commands issued via user interface 106, for example.

Example Use Cases

FIGS. 8A to 8I and 9A to 9B show some example use cases when soccer is the sports event.

FIG. 8A shows an example method of predicting the next time step during the game using the ML model 200.

At step 800, a real life 3D position of the centre of mass of each object (that is, each player and the ball) is recorded for each of a plurality of consecutive time steps (at a frequency of between 4 and 25 Hz, for example, or, more particularly, 20 Hz).

At step 801, for the recorded data at each time step for each object, the change in position of the object with respect to the previous time step in each direction (δx, δy, δz) is determined. This is indicative of the velocity of the object (since the change is known to occur over the fixed period of time corresponding to one time step).

At step 802, for the recorded data at each time step for each player, the distance of the player from the ball in each direction (dx, dy, dz) is determined.

At step 804, for the recorded data at each time step for each player, relevant metadata is determined. For example, the metadata includes the time elapsed during the game so far, the number of yellow and/or red cards associated with the player and/or the total distance run by the player so far during the game.

At step 804, the information determined in steps 800, 801, 802 and 804 for each time step is converted into a sequence of vectors (e.g. a sub-element vector for each object at each time step or an element vector at each time step).

At step 805, the ML model 200 predicts the vector(s) in the next time step in the way previously described. This is then repeated until the end of the game or the end of the current period of play.

FIG. 8B shows an example method of training the ML model 200.

At step 806, initial training of the ML model 200 is implemented using generic training data 203. The generic training data is generated by a games engine of a soccer simulation video game, for example.

At step 807, additional training of the ML model 200 is implemented using specific training data 204. The specific training data is collected from real soccer matches using any suitable object tracking method, for example. For instance, one or more object tracking methods developed by Hawk-Eye® Innovations Limited may be used. The use of the specific training data allows suitable encodings to be established to identify teams, players and in-game events (e.g. in-game events indicating the end of the current period of play), as previously described.

If the specific training data 204 relates to a specific team then, at step 808, the result is a model trained to predict the player and ball positions of that specific team at future time steps. In this case, since the team is always the same, player encodings (identifying individual players) may be used in the input vector sequence but team encodings (identifying the team) are not required.

On the other hand, if the specific training data 204 relates to multiple teams (e.g. all teams in the particular soccer league), then, at step 809, the result is a model trained to predict the player and ball positions of any of those teams at future time steps. In this case, both player encodings (identifying individual players) and team encodings (identifying the team) may be used in the input vector sequence.

FIG. 8C shows an example method in which successive time steps are predicted until an event indicating the end of the current period of play is detected.

At step 810, at least one time step of real data is collected.

At step 811, the at least one time step of real data is input to the ML model 200 as the input sequence 201 to generate the prediction 202.

If the prediction 204 output at step 811 indicates an event indicating the end of the current period of play is detected (based on a predicted value of the event vector, for example), the method proceeds to step 812 and the simulation ends (that is, no more sub-elements of the sequence are predicted).

On the other hand, if the prediction 204 output at step 811 does not indicate an event indicating the end of the current period of play, the method proceeds to step 813.

At step 813, velocity values (δx, δy, δz) are generated.

At step 814, the velocity values (δx, δy, δz) are used to generate new positions (x, y, z) of each object (i.e. the position of each player and the ball).

At step 815, the predicted sub-element vector(s) are added to the sequence. The new sequence is then fed back to step 811 to predict the next sub-element(s).

In this way, the position of each object (players and ball) in the game is predicted for successive time steps until it is predicted that the current period of play has ended.

FIG. 8D shows an example method in which the starting positions of the players and ball are predicted at the start of a new period of play.

At step 816, the simulation starts using initial positions of each player and the ball at the start of the match. Relevant encodings can be used to identify each team and player in the way previously described, for example.

At step 817, the match is then simulated. By "simulation", it is meant that the motion of each of the players and the ball is predicted for each of one or more successive time steps, as previously described. The simulation continues (with sub-element vectors being successively added to the prediction sequence) until an event indicating a break in play (that is, the end of the current period of play) is indicated.

At step 818, the event classification and the one or more sub-element vectors from the previous period of play are input into ML model 703 to predict the starting positions of the players and ball at the start of the next period of play. The method then returns to step 817 so the simulation begins again based on the newly predicted starting positions.

Figures 8E, 8F:
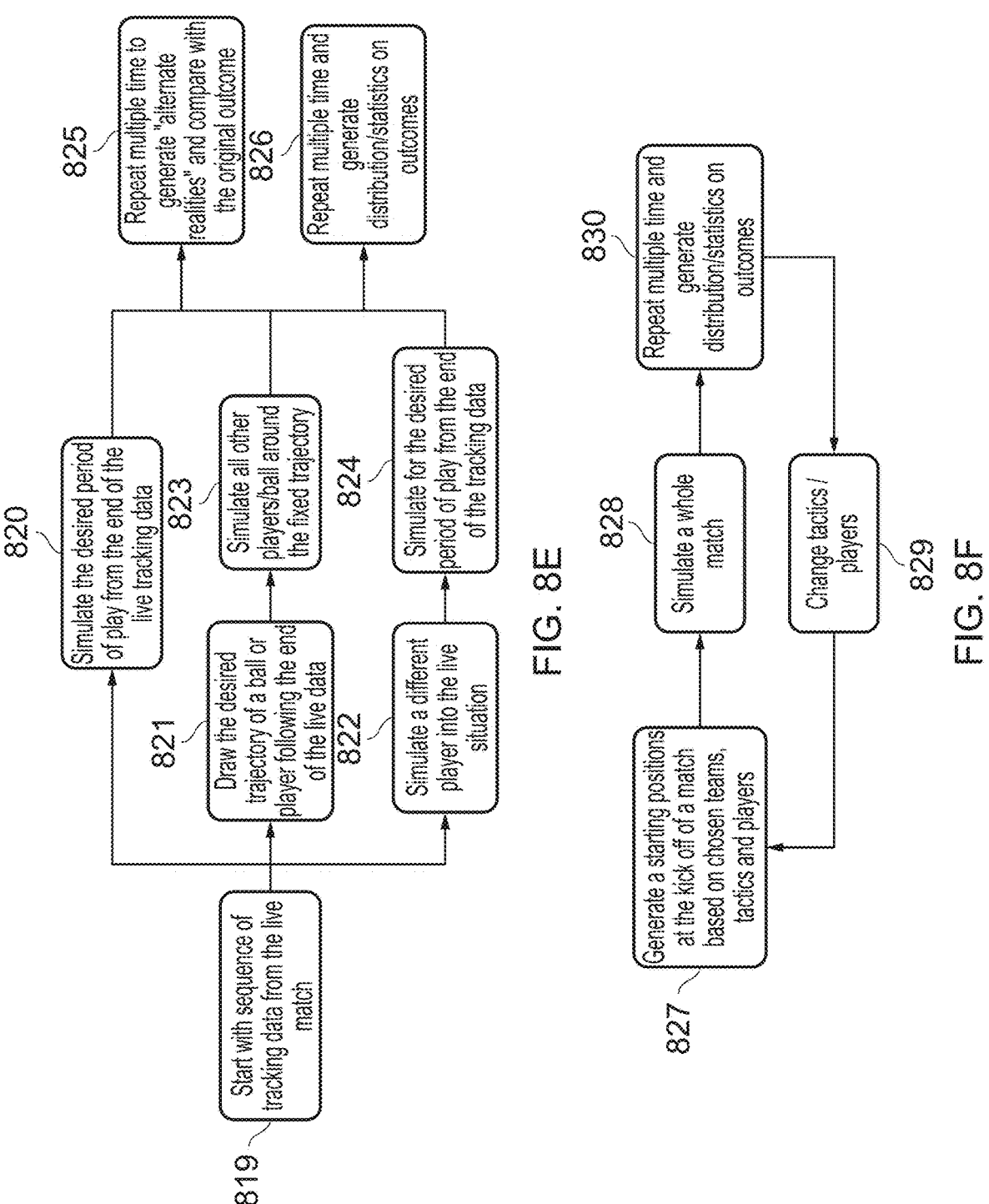
Figure 9A:
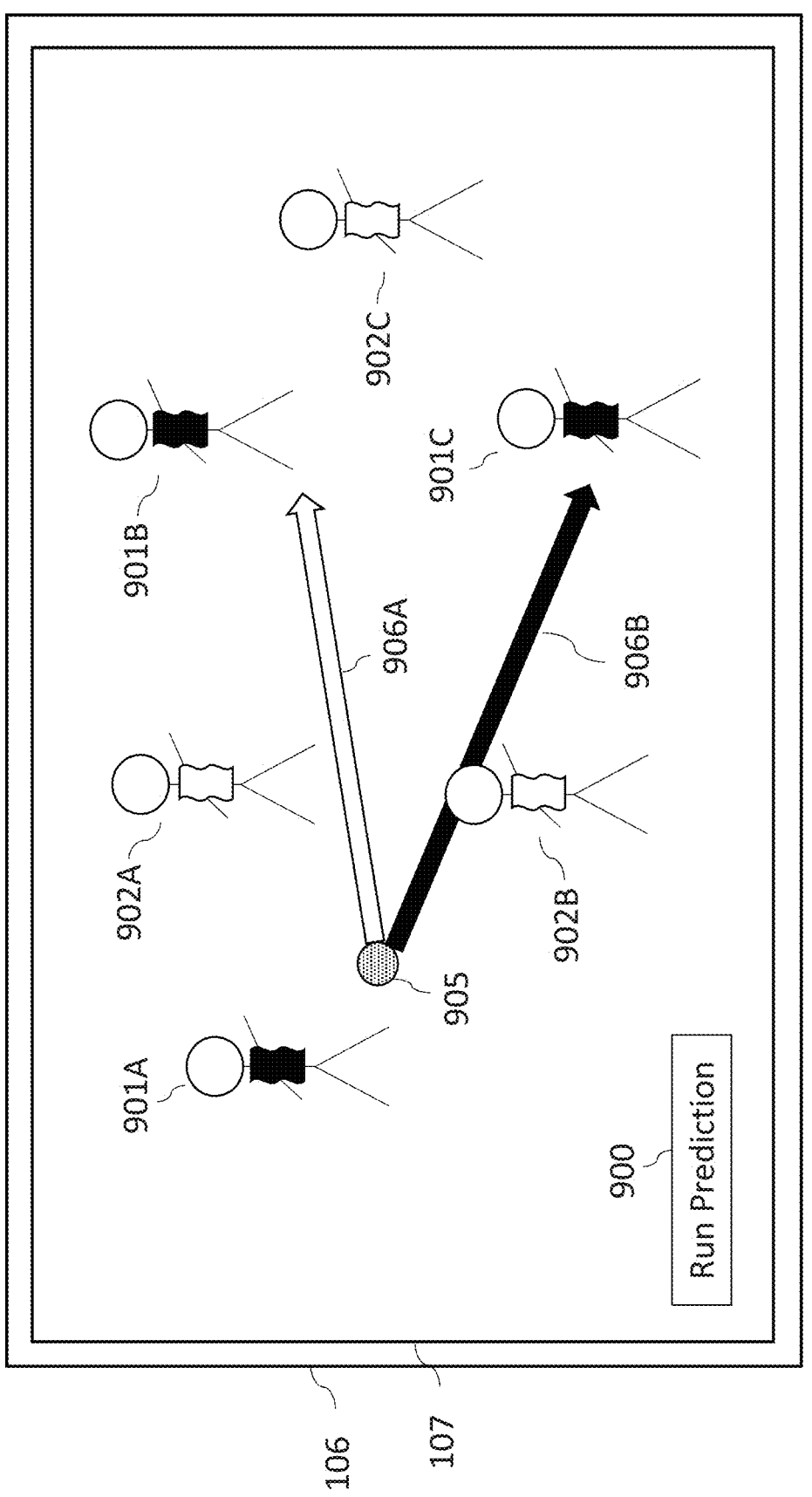
Figure 9B:
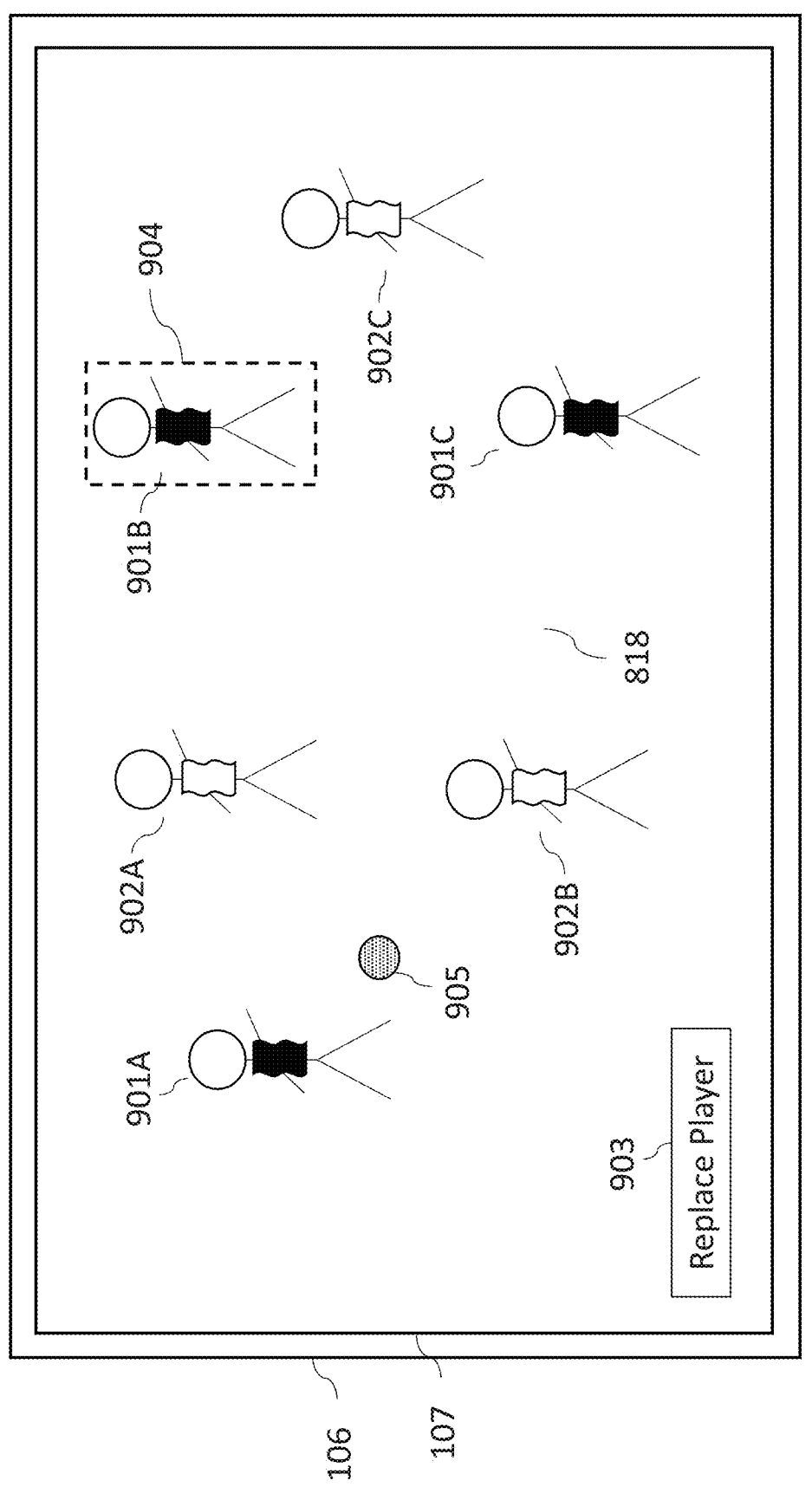

FIG. 8E and FIGS. 9A and 9B show an example method in which different scenarios can be simulated to predict different outcomes. This may be useful in a range of applications, for example team training or sports commentating.

At step 819, an input sequence 201 comprising real tracking data collected from the match is obtained. There are then several options for how to use this tracking data to make predictions.

A first option is to allow the prediction to run without any further input. This is step 820. In the example of FIG. 9A (which shows graphics representing six soccer players, three (901A-C) from a first team and three (902A-C) from a second team, on the touch screen 107 of user interface 106), this corresponds to a prediction of the ball 905 being kicked along path 906A from player 901A to 901C.

A second option is to run the simulation while inputting a desired trajectory of the ball. This is step 821 and is illustrated in FIG. 9A as trajectory 906B. The user may input this trajectory by touching and dragging their finger along the touch screen 107 starting from the soccer ball 905, thus allowing the desired trajectory 906B to be drawn. The trajectory defines a sequence of ball positions over one or more of the next predicted time steps (e.g. the time steps over the next 1 or 2 seconds). This occurs by mapping each position on the graphic displayed on the touch screen with a corresponding position in the calibrated 3D space of the soccer pitch. This means, for example, that the motion of the ball defined by the sub-element bi at each of those time steps is predefined (or fixed). At step 823, in response to the user selecting the "Run Prediction" virtual button 900, the motion of each of the players and/or ball is then predicted based on this constraint.

This is may be used for investigating the success of different strategies during training or in providing predicted alternative realities during broadcast post-match analysis, for example. For instance, in the example of FIG. 9A, by inputting the alternative trajectory 906B, a prediction of what might have happened if player 901A passed the ball to player 901C instead of to player 901B.

In these examples, the ball's real trajectory might already be known (if the analysis is performed on a past portion of a football match). For example, trajectory 906A may have been the real trajectory recorded for the ball. However, by taking the preceding time steps, inputting the alternative trajectory 906B and running the simulation, a predicted alternative reality based on player 901A making a different decision about which other play to pass to can be explored.

In this example, the data elements 300A of the time steps preceding movement of the ball along real trajectory 906A and the data elements 300A of the time steps over which the real trajectory 906A of the ball is defined are a set of first data elements. On the other hand, the data elements 300A of the time steps over which the alternative trajectory 906B is defined are a set of second data elements. The sub-element bi of each second data element is determined based on the alternative trajectory 906B input by the user, for example. In an example, an alternative trajectory 906B input by a user starts from a position of the ball as indicated by one of the first data elements (e.g. the first data element indicating the position of the ball just before it was kicked along real trajectory 906A). Subsequent first data elements (e.g. those representing the real trajectory 906A) are then replaced with the second data elements in the prediction processing.

A third option is to run the simulation while changing one player for another. This allows a user to see whether the chances of success in the game (e.g. a goal being scored) are changed by changing one player (identified by one encoding of the identification vector, for example) with another (identified by a different encoding of the identification vector, for example).

This is step 822 and is illustrated in FIG. 9B. Here, the user selects player 901B by tapping on the touch screen 107 at the location of player 901B. The selection of player 901B is then indicated by the display of box 904. The user may then select the "Replace Player" virtual button 903 and select (from a suitable a menu system or the like, now shown) a different player. Selecting a different player causes the identification vector of the player 901B to be updated and the simulation to be run to predict the motion of each of the players and/or ball based on this different player being player 901B and the ball being passed to this player. Thus, for example, if, in the real game, player 901B is a defender and a goal was not scored, it can be predicted what would have happened if the player 901B was, instead, a striker. Again, this allows a predicted alternative reality to be explored which may be useful for training, post-match analysis and the like.

A prediction based on both an input ball trajectory 906B and exchanging one or more of the players 901A-C and 902A-C (i.e. both steps 821 and 822) at the same time may be implemented. This is made easy by the representation of each player and the ball with suitable sub-element vectors and, where appropriate, encodings. Certain values of the vectors (e.g. those representing the trajectory of the ball and those representing the player encodings) can be fixed in advance (these may be referred to as fixed constraints). The remaining values of the vectors (e.g. the motion of each player) can then be determined by the ML model 200 during the prediction.

For any of the above-mentioned options, the fixed constraints can be changed (e.g. different ball trajectories and different combinations of player identities for the players 901A-C and 902A-C) and the simulation repeated to explored a large number of possible outcomes. This is step 825.

The same fixed constraints can be kept for multiple simulations and, due to the probabilistic nature of the model, the outcome may be different for different simulations using the same fixed constraints and same initial conditions (e.g. ball and player starting positions). If the simulation is repeated a sufficient number of times (e.g. 100, 200, 500 or 1000 times), statistics (e.g. a probability distribution) relating to different outcomes may be determined. For example, for a given identify of the player 901B, the probability that the player scores a goal before the end of the current period of play can be predicted. This can facilitate training and the determination of suitable tactics in the game, for example. This is illustrated in step 826.

The use case of FIG. 8E can be extended to predict the outcome of an entire soccer match (rather than just the current period of play). This is exemplified in FIG. 8F.

At step 827, the starting positions of the players and the ball and the player identities are input. Any suitable tactics may also be input. Data indicative of particular tactics (such as the propensity for a player to stay in their own half or the half of the other team, the propensity for a player to follow the movements of a specific other player of the opposing team or to remain in a particular area of the pitch, etc.) may be further included (as suitable learned encodings, for example) in the metadata vector, for example.

At step 828, the entire soccer match is simulated using the player identities and tactics as fixed constraints. This may be repeated multiple times (step 830) to determine any desired statistics (e.g. the likelihood of a win, loss or draw). The player identities and tactics may then be changed (step 829) and the method repeated. This enables, for example, the best combination of players and tactics for an upcoming real life match against a particular team (with predefined players and tactics, for example) to be predicted, thereby assisting with match training and preparation.

Figures 8G, 8H, 8I:
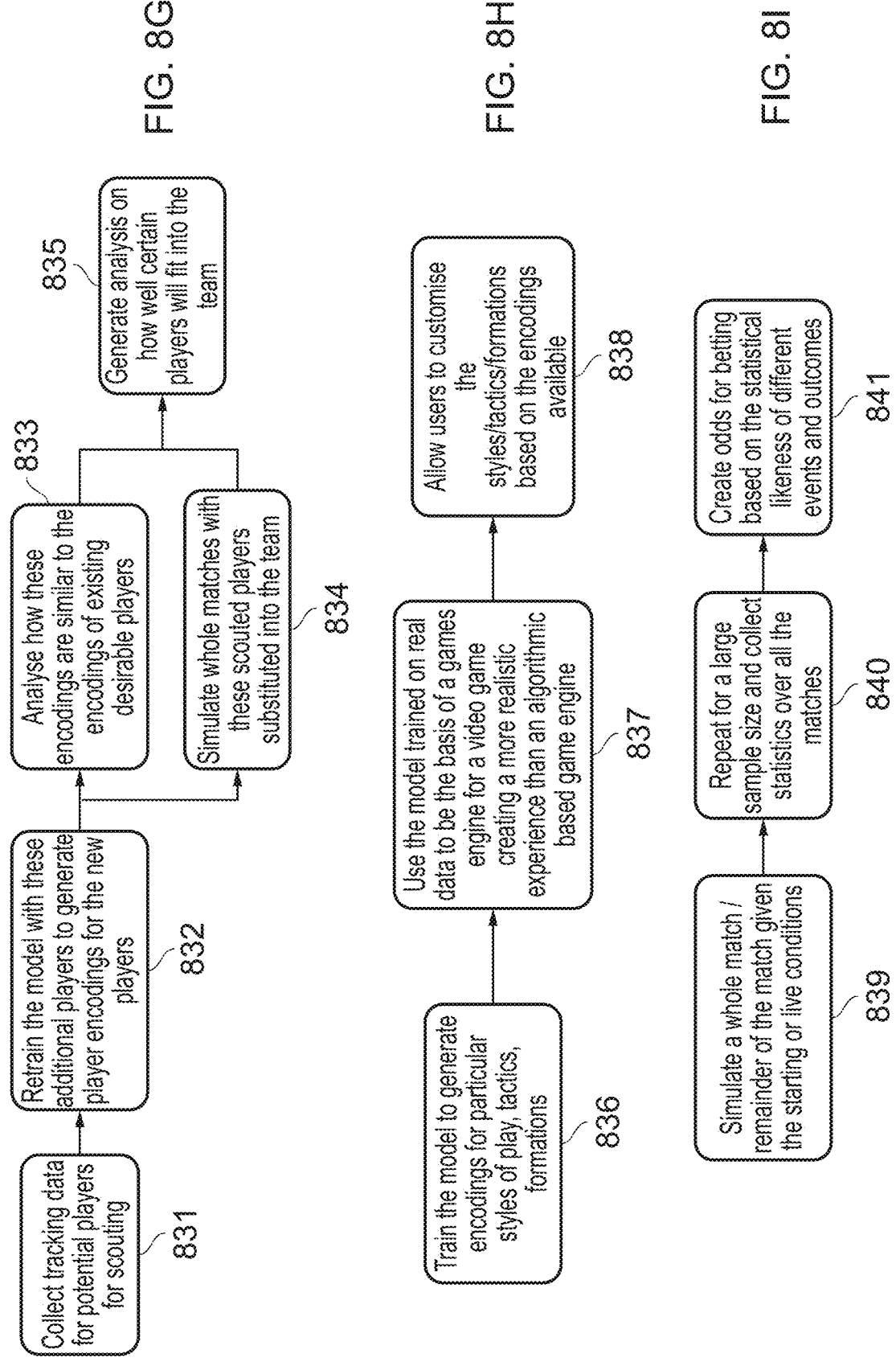

FIG. 8G shows a further example use case of player encodings. Here, the encoding of a particular player of interest who may be offered to join a team may be used to predict that player's impact on the team.

At step 831, tracking data is collected from recorded footage of the player of interest.

At step 832, the ML model 200 is trained to generate an encoding identifying the player.

In one example, at step 833, the identified encoding may be compared with existing players in the team to determine that player's suitability for the team. For example, if an established player of the team is leaving the team (e.g. due to a transfer or retirement), it can be determined whether the encoding of the potential new player is sufficiently similar to that of the player who is leaving. An output indicating the similarity is generated at step 835. The similarity may be cosine similarity of the identification vector of the existing player and potential new player, for example, with a value greater than a predetermined value (e.g. 0.5) indicating a good match between the players.

In another example, at step 834, whole matches can be simulated (e.g. as exemplified in FIG. 8F) including the potential new player (by using the potential new player's encoding for one of the players in the team). This allows the impact of the potential new player on the team's performance to be predicted. For example, the simulation can be run multiple times with and without the player and, at step 835, the number of predicted wins, losses and draws can be determined and compared.

This allows soccer team managers to have more information about the suitability of a potential new player for a team compared to, for example, the existing technique of simply watching the player in the current team they play for.

FIG. 8H shows a more generalised example of the determination of additional encodings. For example, tactics (as mentioned above), styles of play (e.g. more defensive, more offensive) and player formations (e.g. 4-4-2, 5-4-1, etc.) may be encoded. The encodings may be included in the metadata vector of each player or as part of the team encoding (so the team encoding both identifies the team and indicates any particular tactic, style of play and/or formation), for example.

At step 836, the ML model 200 is trained using tracking data from real past soccer games in which different tactics, styles of play, player formations and the like were used. This allows the relevant encodings to be determined.

At step 837, simulation(s) which take into account chosen tactic(s), style(s) of play, player formation(s) and the like are generated. Such simulation(s) may also be used by the games engine of a soccer simulation video game to create more varied and realistic sequences of play. This, in turn, may result in better quality generic training data 203 for initial training of future versions of the ML model 200. The determined encodings also allow users to customise the tactic(s), style(s) of play, player formation(s) and the like selecting different encodings and running the simulation (step 838).

FIG. 8I shows an example use case for sports betting.

At step 839, an entire match (or the remainder of an ongoing match) is simulated.

A step 840, the simulation is repeated (e.g. 100, 200, 500 or 1000 times) to determine the likelihood of a particular outcome (e.g. win for a first team, win for second team, draw, final score or the like).

At step 841, this is then used to determine suitable betting odds.

FIGS. 10A to 10D and 11A to 11B show some example use cases when tennis is the sports event.

Figures 10A, 10B:
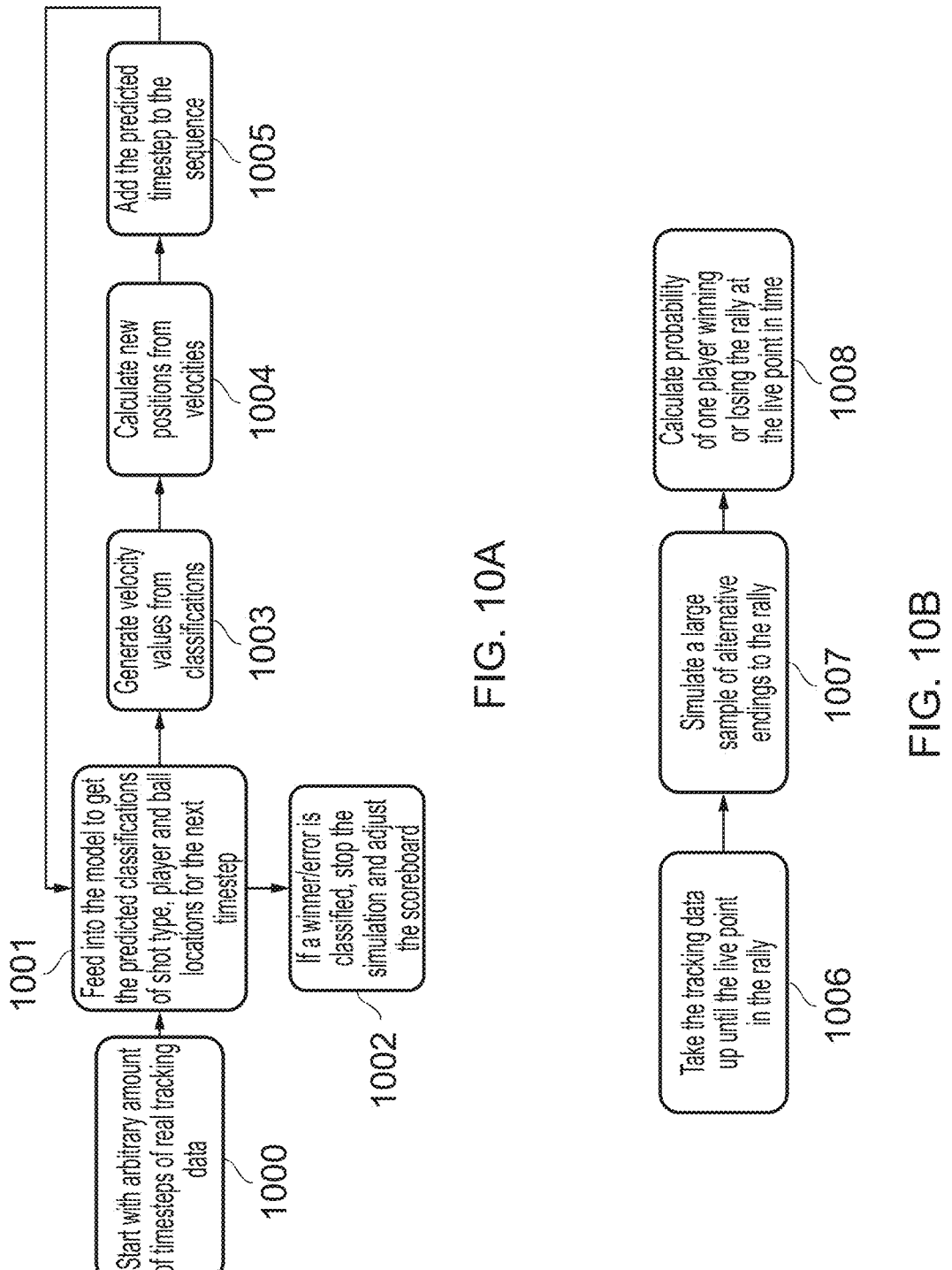

FIG. 10A shows an example method in which successive time steps are predicted until an event indicating the end of the current period of play (rally) is detected.

At step 1000, at least one time step of real data is collected.

At step 1001, the at least one time step of real data is input to the ML model 200 as the input sequence 201 to generate the prediction 202.

If the prediction 204 output at step 1001 indicates an event indicating the end of the current period of the rally is detected (based on a predicted value of the event vector indicating "winner" or "error", for example), the method proceeds to step 1002 and the simulation ends (that is, no more sub-elements of the sequence are predicted).

On the other hand, if the prediction 204 output at step 1001 does not indicate an event indicating the end of the current period of the rally, the method proceeds to step 1003.

At step 1003, velocity values ($\delta x$, $\delta y$, $\delta z$) are generated.

At step 1004, the velocity values ($\delta x$, $\delta y$, $\delta z$) are used to generate new positions (x, y, z) of each object (i.e. the position of each player and the ball).

At step 1005, the predicted sub-element vector(s) are added to the sequence. The new sequence is then fed back to step 1001 to predict the next sub-element(s).

In this way, the position of each object (players and ball) in the tennis match is predicted for successive time steps until it is predicted that the current rally has ended.

FIG. 10B shows an example in which the probability of a player winning or losing the rally at a given point in time is predicted.

At step 1006, real tracking data up until the current point in time is obtained.

At step 1007, the real tracking data is input to the ML model 200. The ML model 200 predicts the next time step(s) until, for example, an event indicating the end of the rally ("winner" or "error") is predicted.

Due to the probabilistic nature of the ML model 200, step 1007 can be repeated many times (e.g. 20, 50 or 100 times) to determine a probability of a particular player hitting a "winner" or "error" at the current stage of the rally. This is step 1008.

Alternatively, the ML model 200 itself may be trained to output a probability of a given one of the players (e.g. current serving player) scoring a "winner" or "error" at the current stage of the rally. The probability may be output as an additional predicted sub-element of the sequence, for example.

The probability determined at the current stage of the rally may be displayed using the user interface 106. This provides a real time (corresponding to the next predicted time step, for example), on-screen probability of one of the players scoring the next "winner" or "error", for example. The data indicative of the current determined probability may be included in a live broadcast of the tennis match, for example.

Figure 10C:
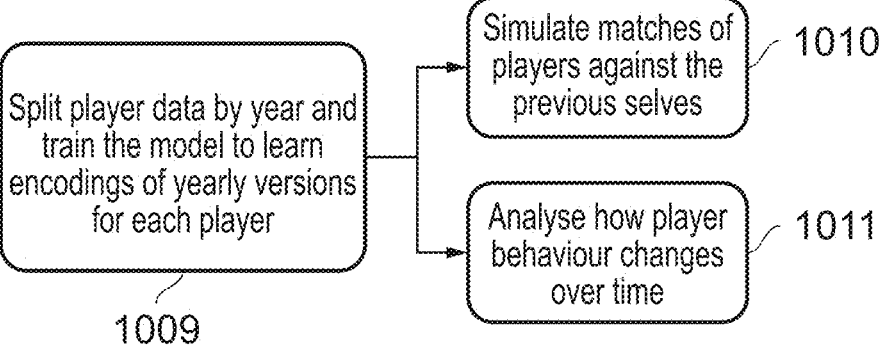
Figure 11A:
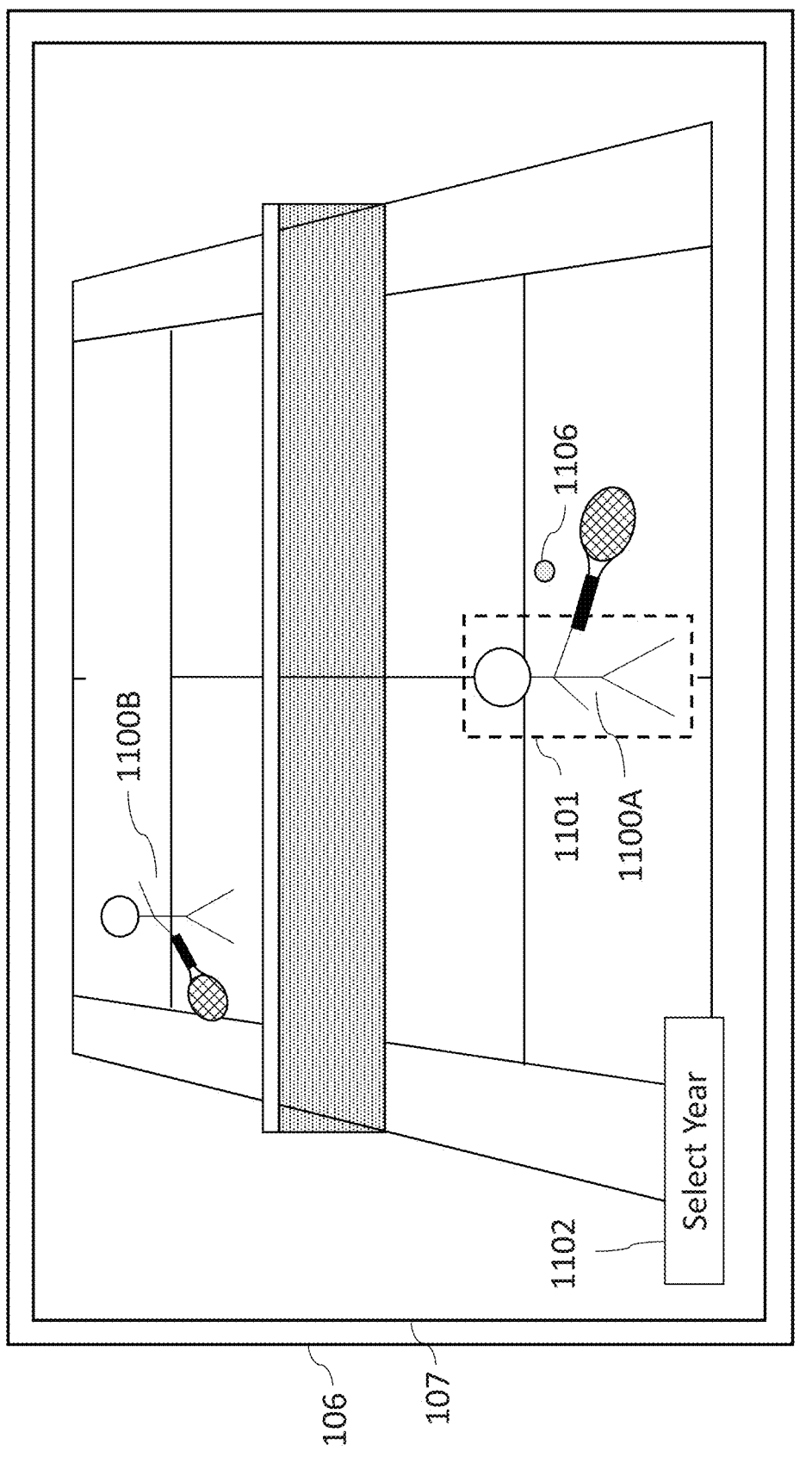

FIGS. 10C and 11A show an example in which a player's progress over time may be reviewed using the ML model 200. This uses the fact that, as a player progresses from year to year (for example, a new entry into professional tennis in their teens to a grand slam champion in their mid-twenties), the encoding used to represent that player will be adjusted accordingly. Thus, for example, the encoding of a player when the ML model 200 is trained using recorded tennis match data from 2013 will be different from the encoding of that same player when the ML model 200 is trained using corresponding data from 2023. If both sets of encodings are determined, then a simulation of a match between the 2013 version of the player and the 2023 version of the player can be implemented.

Thus, at step 1009, the ML model 200 is trained using recorded data of the player for each year of their career. A different encoding for the same player at each year is therefore obtained. A player encoding may also be determined using data from multiple years, with data from more recent years weighted more heavily during the ML model training than data from less recent years.

At step 1010, a match between different versions of the same player in different years is then simulated. In the example of FIG. 11A, a user is able to select which year is to be used for each of two versions of the same player 1100A and 1100B by selecting an appropriate one of the players using the touch screen 107. In this example, player 1100A is selected. The selected player is indicated by box 1101. The user then selects the "Select Year" virtual button 1102. This brings up a menu system or the like (not shown) to allow the user to select from any of the years for which an encoding has been generated. This provides an easy to use tool useful for training or sports broadcasting, for example.

At step 1011, the encodings can also be used to see how a player's game has changed over time. For example, if there are several successive years in which the player has similar encodings followed by a year when the encoding becomes significantly different, then this may be indicative of changes to the player's game based on them sustaining and injury or having different coach, for example. The comparison of encodings may be implemented using the cosine similarity of pairs of identification vectors for the player for successive years, for example. A cosine similarity of less than a predetermined number (e.g. 0.5) may indicate a change in the player's form which can then be investigated.

It will be appreciated that a different time scale granulation (rather than "years") may be used, as long as the points in time between which performance of the same player is compared is sufficient for a different learned encodings for that player to be established.

Figure 10D:
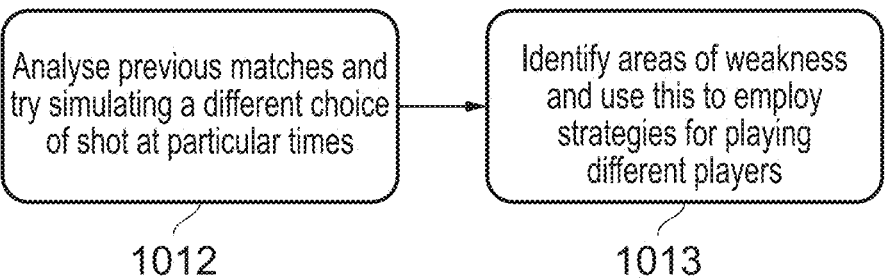
Figure 11B:
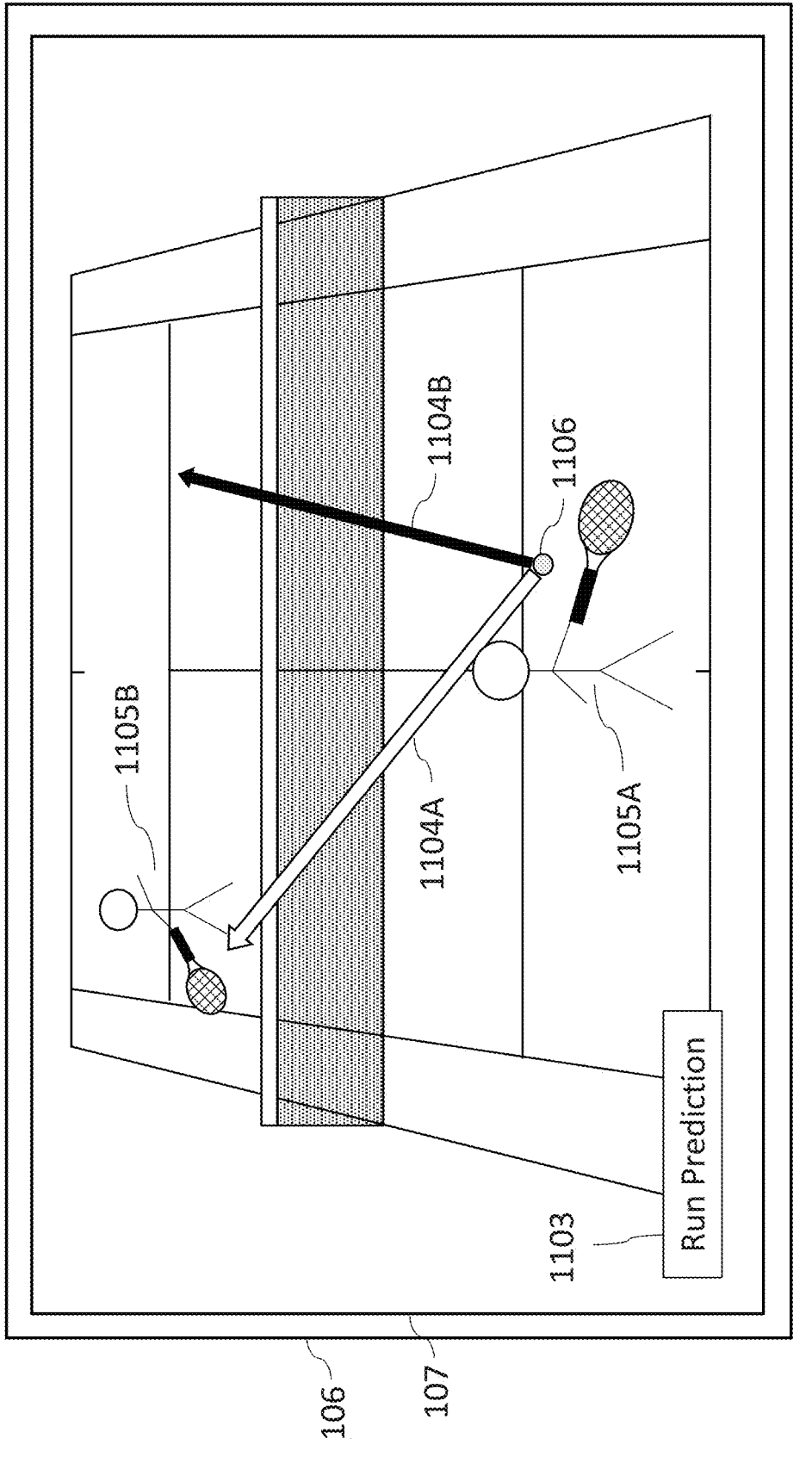

FIGS. 10D and 11B show an example in which the outcome of an alternative shot choice is predicted for a first player 1105A in a match against a second player 1105B.

In this case, the shot in the real match has already happened (indicated by trajectory 1104A) and the outcome of this is known (for example, it may have allowed player 1105B to score a "winner"). However, the user now inputs an alternative trajectory 1104B for the shot. The user may again input this trajectory by touching and dragging their finger along the touch screen 107 starting from the tennis ball 1106, thus allowing the desired trajectory 1104B to be drawn.

The trajectory 1104B once again defines a sequence of ball positions over one or more of the next predicted time steps (e.g. the time steps over the next 1 or 2 seconds). This occurs by mapping each position on the graphic displayed on the touch screen with a corresponding position in the calibrated 3D space of the tennis court. This means, for example, that the motion of the ball defined by the sub-element bi at each of those time steps is predefined (or fixed). At step 1012, in response to the user selecting the "Run Prediction" virtual button 1103, the motion of each of the players and/or ball is predicted based on this constraint.

Again, this may be used for investigating the success of different strategies during training or in providing predicted alternative realities during broadcast post-match analysis, for example. For instance, in the example of FIG. 11B, by inputting the alternative trajectory 1104B, a prediction of what might have happened if player 1105A had hit the ball on the opposite side of the court to where player 1105B was positioned (rather than straight at player 1105B, as per the real recorded trajectory 1104A).

This may be repeated with different shot trajectories and/or with different shot classifications (for example "backhand", "forehand", "volley", "ace" and the like) multiple times to determine statistics regarding, for example, the best strategy for competing against a particular player (step 1013). The shot classification may be indicated by a further learned encoding included in a further sub-element (or in an existing sub-element such as the event vector) at each time step, for example.

In this example, the data elements 300A of the time steps preceding movement of the ball along real trajectory 1104A and the data elements 300A of the time steps over which the real trajectory 1104 of the ball is defined are a set of first data elements. On the other hand, the data elements 300A of the time steps over which the alternative trajectory 1104B is defined are a set of second data elements. The sub-element bi of each second data element is determined based on the alternative trajectory 906B input by the user, for example. In an example, an alternative trajectory 906B input by a user starts from a position of the ball as indicated by one of the first data elements (e.g. the first data element indicating the position of the ball just before it was hit along real trajectory 1104A). Subsequent first data elements (e.g. those representing the real trajectory 906A) are then replaced with second data elements in the prediction processing.

Figure 12:
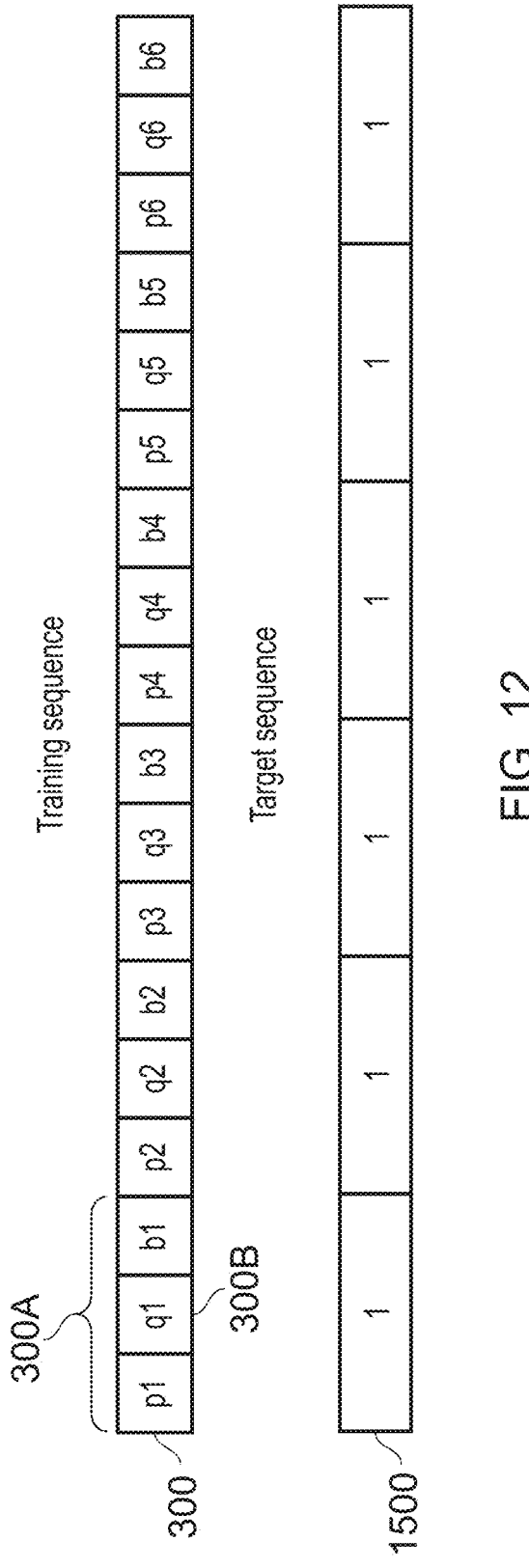

FIG. 12 shows another example of a training and target sequence when the sports event is a tennis match. The training sequence 300 takes the same form as before (that is, with a plurality of elements 300A for respective successive time steps, each element comprising sub-elements 300B indicating position information of each of the players and the ball). This time, however, the target sequence 1500 is a sequence of 0s or 1s to indicate which of the players won the rally during which the position information of the training sequence 300 was recorded (this being known in advance since the training data is taken from the past). That is, if one of the players won the rally, the target sequence is a sequence of 0s. If the other of the players won the rally, the target sequence is a sequence of 1s. Here, it can be seen the target sequence 1500 is a sequence of 1s. In an example, a sequence of 0s indicates the receiving player (receiver) won the rally and a sequence of 1s indicates the serving player (server) won the rally.

By training the ML model 200 using this data, the ML model 200 takes the same input sequence 201 as previously described and outputs a probability of a given player winning the current rally at the current time step. The underlying architecture of the ML model 200 is the same as previously described (e.g. the transformer decoder architecture is used combined with the attention mask) except that the target is changed to a binary classification. In particular, the ML model 200 comprises a binary classifier trained so the model outputs a number between 0 and 1 for each time step and the binary cross entropy loss punishes the model for how far from the target (0 or 1) the number is. At the end of training, since the model will be trained as a best fit to the data, the predicted number can be interpreted as a probability that the server wins the rally. That is, assuming the assignment of sequences of 0s to the receiver and sequences of 1s to the server during the training, the closer the predicted number is to 1, the higher the probability that the server wins the rally. Conversely, the closer the predicted number is to 0, the higher the probability that the receiver wins the rally.

FIGS. 13A and 13B show some example uses cases for this technique.

FIG. 13A demonstrates the operation of a real time probability determination tool. At step 1501, the tracking data from the start of the rally up to the current point in the rally (up to the maximum amount of tracking data in the rolling time window) is obtained. At step 1502, the tracking data is input as an input sequence 201 to the ML model 200. At step 1503, the output probability for the most recent time step is obtained. At step 1504, the output probability is used to generate a graphic displayed on the screen 107 of the user interface 106. This graphic may also be included in broadcast images of the tennis match, thereby providing a remote audience with the probability information and improving audience engagement.

Figure 14:
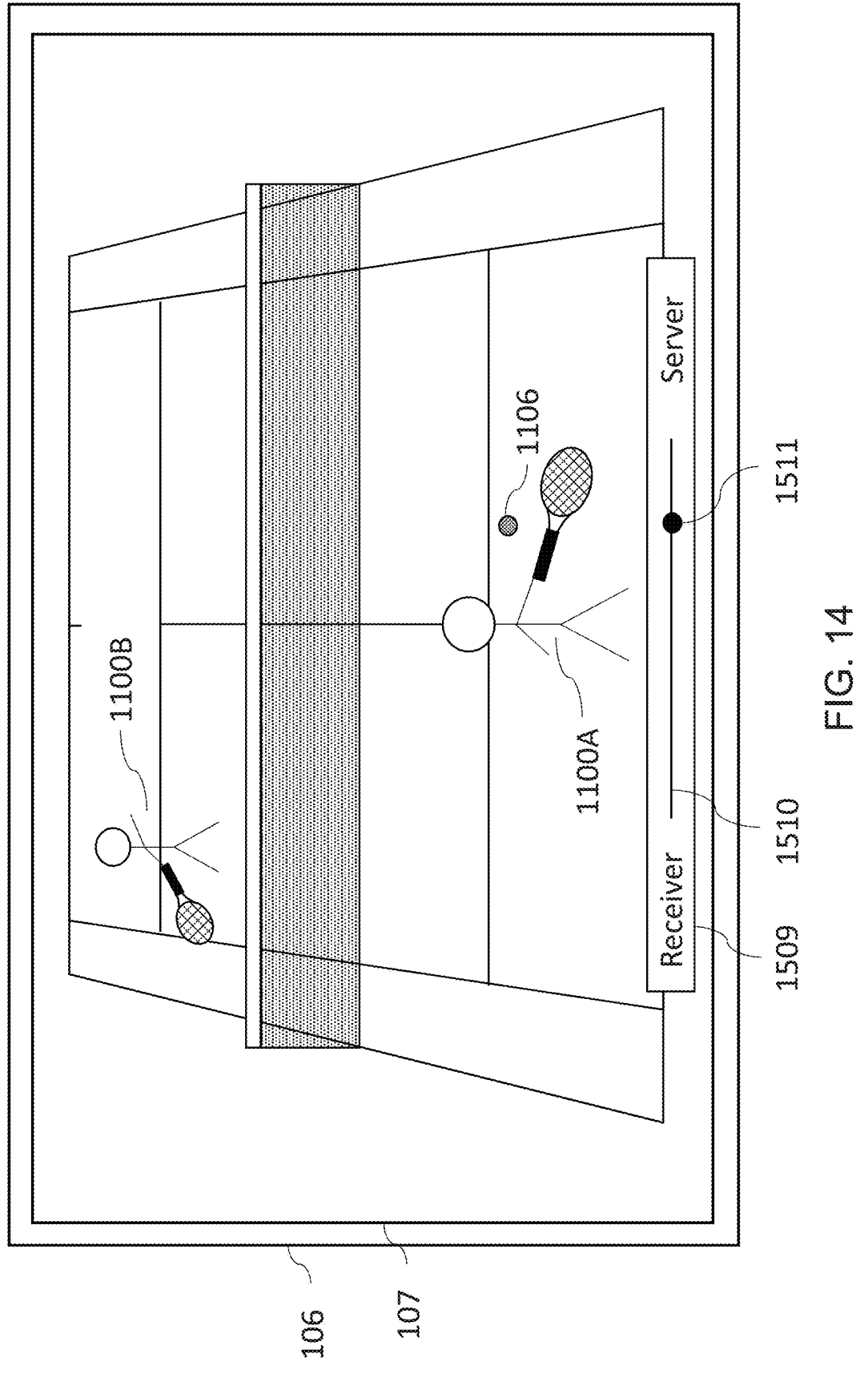

FIG. 14 shows an example of such a graphic 1509 displayed with images of the tennis match. The graphic 1509 is overlaid on the images of the tennis match and comprises a slide bar 1510 positioned between indications of the "Receiver" and "Server". The slide bar 1510 comprises a movable slider 1511 which moves depending on the output probability at the current time step. Thus, for example, the closer the probability is to 1 (indicating the server is more likely to win the current rally), the further towards the right (where "Server" is indicated) the movable slider 1511 will be positioned (with the rightmost position of the movable slider 1511 corresponding to a probability of 1). Conversely, the closer the probability is to 0 (indicating the receiver is more likely to win the current rally), the further towards the left (where "Receiver" is indicated) the movable slider 1511 will be positioned (with the leftmost position of the movable slider 1511 corresponding to a probability of 0). This provides a useful and engaging graphic which is updated in real time to show the win probability at the current time step.

In FIG. 13B demonstrates the operation of a best shot determination tool. This may be useful for reviewing tracking data which has already been collected (e.g. in a past tennis match or past portion of a tennis match) during training or analysis.

At step 1505, the tracking data from the start of a rally up to a point in the rally when a shot is about to be played is obtained. At step 1506, multiple simulated trajectories of the shot are input (e.g. as exemplified with trajectory 1104B in FIG. 11B). At step 1507, for each simulated trajectory, the combination of obtained tracking data and simulated tracking data (defining the simulated trajectory) are then input to the ML model 200. Thus, for example, if the rolling time window is T seconds, then, for each input trajectory, there may be T/2 seconds of real tracking data (up to the point just before the shot, this being the same for all input trajectories) followed by T/2 seconds of simulated tracking data (this being different for each input trajectory). This causes the ML model 200 to output a probability indicating the likely winner (as previously described) for each input trajectory. At step 1508, the best shot can then be determined. Thus, for example, if the player making the shot is the server, a shot along the one of the input trajectories with the probability closest to 1 will be the best shot. Conversely, if the player making the shot is the receiver, a shot along the one of the input trajectories with the probability closest to 0 will be the best shot. This presents a useful training and analysis tool, allowing the outcome of different shot trajectories to be comprehensively predicted and reviewed.

It will be appreciated that this technique may be applied to other sports events (or portions of sports events) where a sequence of elements indicating position information of players and/or a ball and a known outcome is used to train the ML model 200 to predict probabilities using a binary classifier. For example, in soccer, the probability of a goal being scored following a shot may be determined if the ML model 200 is trained using a target sequence with a sequence of 1s when a goal is scored and sequence of 0s when a goal is not scored.

Figure 15:
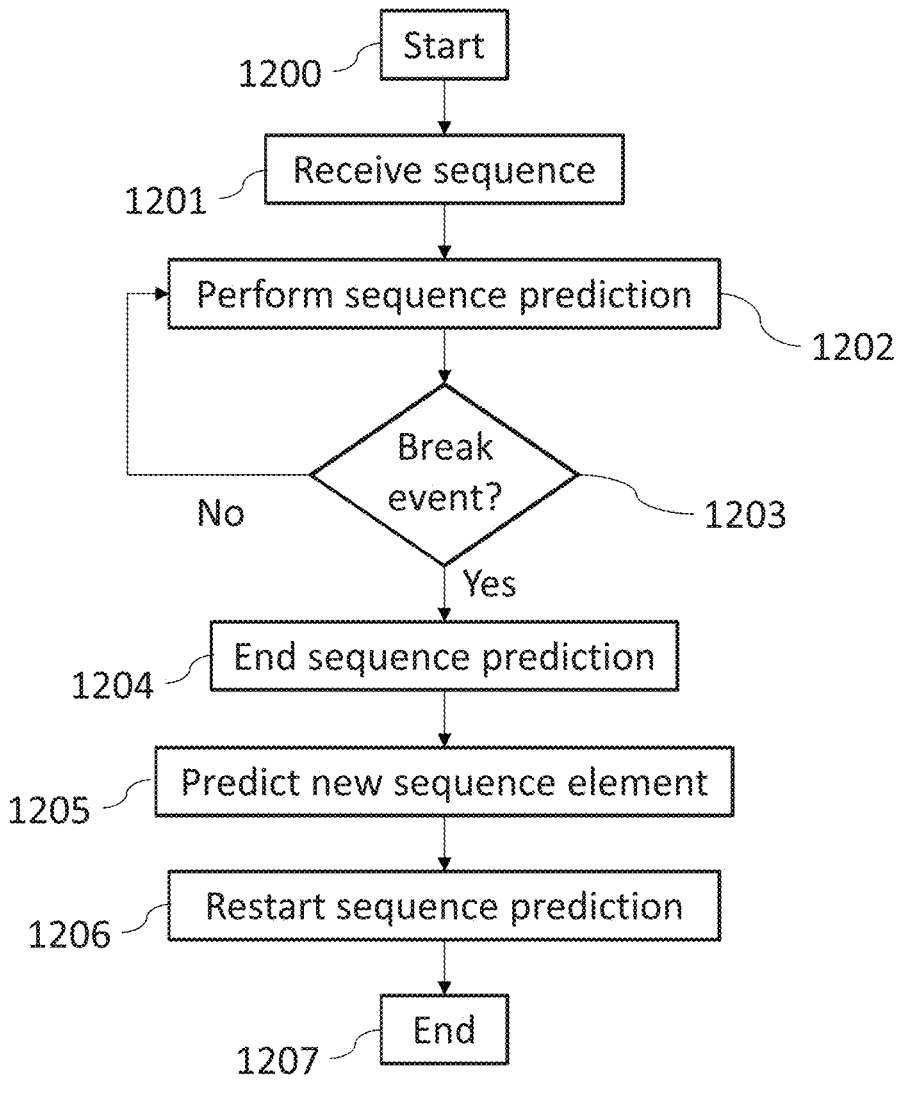
FIG. 15 shows a first example data processing method.

FIG. 15 shows an example method according to the present technique. The method is a computer-implemented method implemented by processor 102, for example.

The method starts at step 1200.

At step 1201, a sequence of one or more input data elements (e.g. the first data element of sequence 700A or 700B) is received, the one or more input data elements indicating position information (e.g. via sub-elements (p1, q1, b1)) of one or more objects (e.g. player(s) and a ball) in a sports event at respective successive time steps. In the examples of sequences 700A and 700B, for simplicity, there is only one input data element in the form of the first data element, so there is only a single time step. However, if there were multiple successive input data elements, there would be multiple corresponding successive time steps.

At step 1202, a sequence prediction process is performed (e.g. by ML model 200) using the sequence of one or more input data elements to predict a first predicted data element at a first future time step (e.g. predicted data element 701). The first predicted data element indicates predicted position information (e.g. via sub-elements (p2, q2, b2)) of the one or more objects at the first future time step.

At step 1203, it is determined whether a break event associated with a break in the sports event is predicted to occur. In the example FIG. 7A, based on the classification of the predicted data element 701 of sequence 700A by the ML model 200 (e.g. via sub-element s2), it is determined that no break event is predicted to occur. On the other hand, in the example of FIG. 7B, based on the classification of the predicted data element 701 of sequence 700B (e.g. via sub-element s2), it is determined that a break event is predicted to occur.

If a break event is not predicted to occur, then the method returns to step 1202 and the performance of the sequence prediction process is continued at least the first predicted data element (e.g. the first predicted data element and at least some of the input data elements, depending on the number of input elements and the capacity of the rolling time window) to predict a second predicted data element at a second future time step. The second predicted data element indicates predicted position information of the one or more objects at the second future time step. This occurs for the sequence 700A, for example, which the next data element comprising sub-elements (p3, q3, b3, s3) is predicted.

On the other hand, if a break event is predicted to occur, the method proceeds to step 1204 and the current sequence prediction process is ended. This occurs for the sequence 700B, for example.

At step 1205, the first predicted data element (and, optionally, at least some of the original input data elements) is used to predict a third predicted data element (e.g. using ML model 703). The third predicted data element (e.g. predicted data element 702 in FIG. 7C) indicates predicted position information (e.g. via sub-elements (p1', q1', b1')) of the one or more objects at a point at which the sports event is continued.

At step 1206, the sequence prediction process is restarted using the third predicted data element. This is exemplified by new prediction sequence 704 in FIG. 7D.

The method ends at step 1207.

Figure 16:
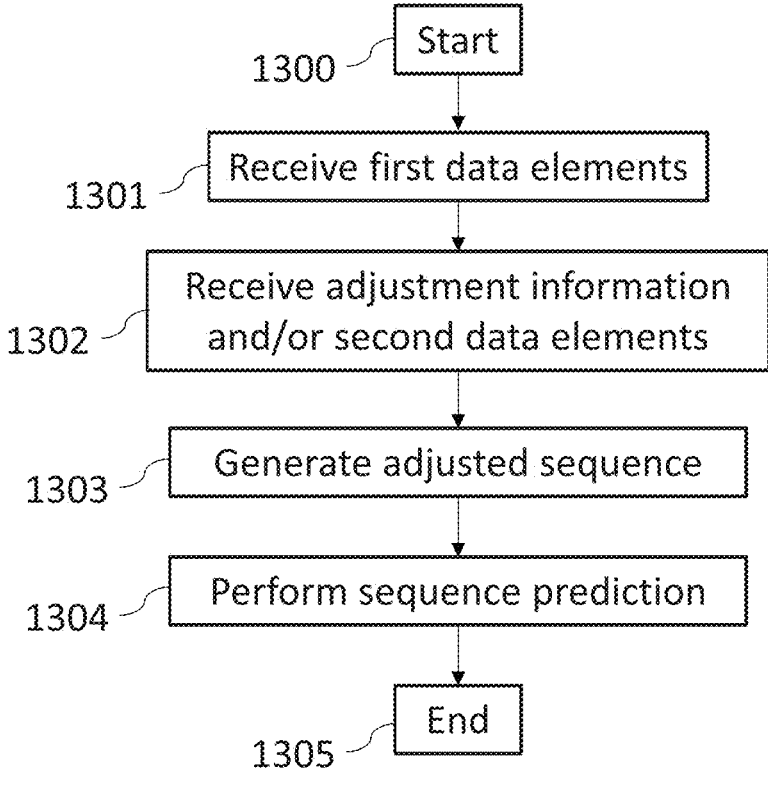
FIG. 16 shows a second example data processing method.

FIG. 16 shows an example method according to the present technique. The method is a computer-implemented method implemented by processor 102, for example.

The method starts at step 1300.

At step 1301, a sequence of one or more first data elements (e.g. data elements 300A of sequence 300) is received. The one or more first data elements indicate position information (e.g. via sub-elements (pi, qi, bi)) of one or more objects (e.g. player(s) and a ball) in a sports event at a first set of respective successive time steps. The position information indicated by the one or more first data elements is obtained from object tracking data collected during the sports event. It thus represents recorded position information of objects in the real life sports event.

At step 1302, at least one of (i) adjustment information for adjusting the one or more first data elements and (ii) one or more second data elements is received. The adjustment information includes, for example, an identity (e.g. in the form of a learned encoding) of a different player in the sports event (as exemplified with reference to FIG. 9B or 11B, for example). The adjustment information may also include any other learned encoding (such as the learned encoding of a different shot type in tennis). The one or more second data elements indicates position information of the one or more objects at a second set of respective successive time steps, the position information indicated by the one or more second data elements being determined based on user input (for example, by a drawn alternative trajectory, as exemplified in FIG. 9A or 11A).

At step 1303, an adjusted sequence comprising at least one of (i) one or more adjusted first data elements adjusted using the adjustment information and (ii) the one or more second data elements is generated.

At step 1304, a sequence prediction process is performed (e.g. by ML model 200) using the adjusted sequence to predict a predicted data element at a future time step. The predicted data element indicates predicted position information of the one or more objects at the future time step.

Thus, in a first example, the adjusted sequence comprises the one or more first data elements but with the learned encoding of one player in those data elements substituted for that of another player. This allows alternative outcome(s) to be predicted if the tracked positions of the player(s) and ball remain the same but one of the players is substituted for another.

In a second example, the adjusted sequence comprises the one or more generated second data elements and, optionally, the one or more non-adjusted first data elements (which, for example, will precede the one or more second data elements in the adjusted sequence). This allows alternative outcome (s) to be predicted when the identity of the player(s) remain the same but when the real, tracked trajectory of the ball replaced with a trajectory input by the user.

The first and second examples may be combined to, for example, explore different trajectory and different player combinations.

The method ends at step 1305.

Figure 17:
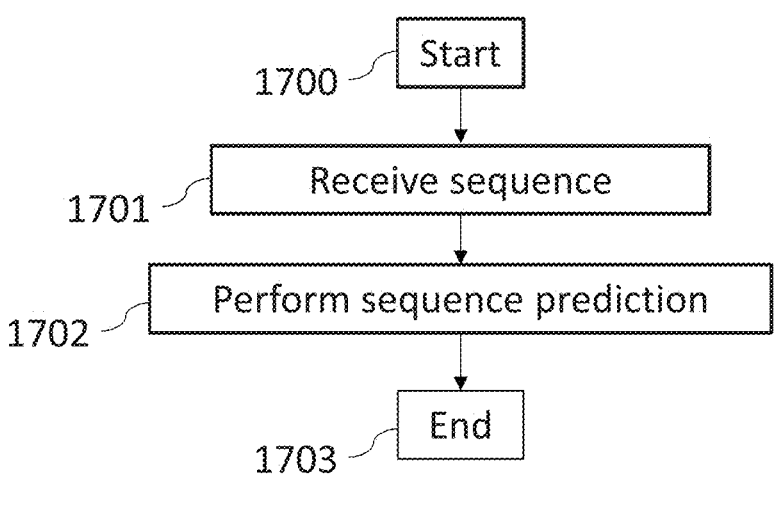
FIG. 17 shows a third example data processing method.

FIG. 17 shows an example method according to the present technique. The method is a computer-implemented method implemented by processor 102, for example.

The method starts at step 1700.

At step 1701, a sequence of one or more input data elements (e.g. data elements 300A of sequence 300) is received. The one or more input data elements indicate position information (e.g. via sub-elements (pi, qi, bi)) of one or more objects in a sports event (e.g. players and a ball in a tennis match) at respective successive time steps.

At step 1702, a sequence prediction process is performed using the sequence of one or more input data elements to predict a predicted data element. The predicted data element indicates a probability (e.g. an output of between 0 and 1 by a binary classifier of ML model 200) of a predetermined outcome in the sports event (e.g. the serving player winning the current rally in a tennis match).

The method ends at step 1703.

Although the specific examples shown relate to soccer and tennis, it will be appreciated that the present technique may be applied to any other sports event which involves the tracking of objects such as participant(s) (e.g. player(s)) and/or ball(s).

Example(s) of the present technique are defined by the following numbered clauses:

1. A data processing apparatus comprising circuitry configured to:

receive a sequence of one or more input data elements, the one or more input data elements indicating position information of one or more objects in a sports event at respective successive time steps;

perform a sequence prediction process using the sequence of one or more input data elements to predict a first predicted data element at a first future time step, the first predicted data element indicating predicted position information of the one or more objects at the first future time step;

determine whether a break event associated with a break in the sports event is predicted to occur;

if a break event is not predicted to occur, continue performing the sequence prediction process using at least the first predicted data element to predict a second predicted data element at a second future time step, the second predicted data element indicating predicted position information of the one or more objects at the second future time step; and if a break event is predicted to occur:

end the sequence prediction process;

use at least the first predicted data element to predict a third predicted data element, the third predicted data element indicating predicted position information of the one or more objects at a point at which the sports event is continued; and restart the sequence prediction process using the third predicted data element.

2. A data processing apparatus according to clause 1, wherein the position information comprises one or more of an absolute position of each of the one or more objects and a change in position of each of the one or more objects with respect to a previous time step.

3. A data processing apparatus according to any preceding clause, wherein the one or more objects comprise one or more participants of the sports event and a ball.

4. A data processing apparatus according to clause 3, wherein the position information comprises a distance of each of the one or more participants from the ball.

5. A data processing apparatus according to any preceding clause, wherein each data element comprises a sub-element for each object indicating the position information of the object and a sub-element indicating a type of event which occurs in the sports event.

6. A data processing apparatus according to clause 5, wherein the circuitry is configured to classify each data element to determine whether the indicated type of event is a break event.

7. A data processing apparatus according to clause 5 or 6, wherein the one or more objects comprise a participant of the sports event and the sub-element for the participant indicates at least one of an identity of the participant and an identity of a team of the participant.

8. A data processing apparatus according to any one of clauses 5 to 7, wherein the sub-elements of each of the predicted data elements are predicted using only data elements of one or more previous time steps.

9. A data processing apparatus according to any one of clauses 5 to 7, wherein at least one sub-element of each of the predicted data elements is predicted using at least one already-predicted sub-element at a current time step.

10. A data processing apparatus according to any preceding clause, wherein the sports event is a soccer match and the break event is a goal, corner kick, goal kick, throw in, free kick, penalty kick or offside call.

11. A data processing apparatus according to any preceding clause, wherein the sports event is a tennis match and the break event is a shot classified as a winner or an error.

12. A data processing method comprising:

receiving a sequence of one or more input data elements, the one or more input data elements indicating position information of one or more objects in a sports event at respective successive time steps;

performing a sequence prediction process using the sequence of one or more input data elements to predict a first predicted data element at a first future time step, the first predicted data element indicating predicted position information of the one or more objects at the first future time step;

determining whether a break event associated with a break in the sports event is predicted to occur;

if a break event is not predicted to occur, continue performing the sequence prediction process using at least the first predicted data element to predict a second predicted data element at a second future time step, the second predicted data element indicating predicted position information of the one or more objects at the second future time step; and if a break event is predicted to occur:

ending the sequence prediction process;

using at least the first predicted data element to predict a third predicted data element, the third predicted data element indicating predicted position information of the one or more objects at a point at which the sports event is continued; and restarting the sequence prediction process using the third predicted data element.

13. A program for controlling a computer to perform a method according to clause 12.

14. A computer-readable storage medium storing a program according to clause 13.

15. A data processing apparatus comprising circuitry configured to:

receive a sequence of one or more first data elements, the one or more first data elements indicating position information of one or more objects in a sports event at a first set of respective successive time steps, the position information indicated by the one or more first data elements being obtained from object tracking data collected during the sports event;

receive at least one of (i) adjustment information for adjusting the one or more first data elements and (ii) one or more second data elements, the one or more second data elements indicating position information of the one or more objects at a second set of respective successive time steps, the position information indicated by the one or more second data elements being determined based on user input;

generate an adjusted sequence comprising at least one of (i) one or more adjusted first data elements adjusted using the adjustment information and (ii) the one or more second data elements;

perform a sequence prediction process using the adjusted sequence to predict a predicted data element at a future time step, the predicted data element indicating predicted position information of the one or more objects at the future time step.

16. A data processing apparatus according to clause 15, wherein the position information comprises one or more of an absolute position of each of the one or more objects and a change in position of each of the one or more objects with respect to a previous time step.

17. A data processing apparatus according to any one of clauses 15 to 16, wherein the one or more objects comprise one or more participants of the sports event and a ball.

18. A data processing apparatus according to clause 17, wherein the position information comprises a distance of each of the one or more participants from the ball.

19. A data processing apparatus according to any one of clauses 15 to 18, wherein each data element comprises a sub-element for each object indicating the position information of the object.

20. A data processing apparatus according to clause 19, wherein the sub-elements of the predicted data element are predicted using only data elements of one or more previous time steps.

21. A data processing apparatus according to clause 19, wherein at least one sub-element of the predicted data element is predicted using at least one already-predicted sub-element at a current time step.

22. A data processing apparatus according to any one of clauses 19 to 21, wherein:

the one or more objects comprise a participant of the sports event and the sub-element for the participant indicates an identity of the participant;

the adjustment information comprises information for adjusting an identity of the participant; and the sub-element for the participant in the adjusted sequence indicates an adjusted identity of the participant.

23. A data processing apparatus according to clause 22, wherein:

the adjustment information comprises an identity of a different participant; and the sub-element for the participant in the adjusted sequence indicates the identity of the different participant.

24. A data processing apparatus according to clause 22, wherein:

the adjustment information comprises an identity of the participant at a different point in time; and the sub-element for the participant in the adjusted sequence indicates the identity of the participant at the different point in time.

25. A data processing apparatus according to any one of clauses 22 to 24, wherein the identity of the participant is a learned encoding of the sequence prediction process.

26. A data processing apparatus according to any one of clauses 15 to 25, wherein the sports event is a soccer match.

27. A data processing apparatus according to any one of clauses 15 to 26, wherein the sports event is a tennis match.

28. A data processing method comprising:
receiving a sequence of one or more first data elements, the one or more first data elements indicating position information of one or more objects in a sports event at a first set of respective successive time steps, the position information indicated by the one or more first data elements being obtained from object tracking data collected during the sports event;
receiving at least one of (i) adjustment information for adjusting the one or more first data elements and (ii) one or more second data elements, the one or more second data elements indicating position information of the one or more objects at a second set of respective successive time steps, the position information indicated by the one or more second data elements being determined based on user input;
generating an adjusted sequence comprising at least one of (i) one or more adjusted first data elements adjusted using the adjustment information and (ii) the one or more second data elements;
performing a sequence prediction process using the adjusted sequence to predict a predicted data element at a future time step, the predicted data element indicating predicted position information of the one or more objects at the future time step.

29. A data processing apparatus comprising circuitry configured to:
receive a sequence of one or more input data elements, the one or more input data elements indicating position information of one or more objects in a sports event at respective successive time steps; and
perform a sequence prediction process using the sequence of one or more input data elements to predict a predicted data element, the predicted data element indicating a probability of a predetermined outcome in the sports event.

30. A data processing apparatus according to clause 29, wherein the position information comprises one or more of an absolute position of each of the one or more objects and a change in position of each of the one or more objects with respect to a previous time step.

31. A data processing apparatus according to clause 29 or 30, wherein the one or more objects comprise one or more participants of the sports event and a ball.

32. A data processing apparatus according to clause 31, wherein the position information comprises a distance of each of the one or more participants from the ball.

33. A data processing apparatus according to any one of clauses 29 to 18, wherein each data element comprises a sub-element for each object indicating the position information of the object.

34. A data processing apparatus according to any one of clauses 29 to 33, wherein:
the sports event is a tennis match;
the one or more input data elements indicate position information of each of players and of a ball during a rally of the tennis match at the respective successive time steps; and
the predetermined outcome is a predetermined one of the players winning the rally.

35. A data processing apparatus according to clause 34, wherein:
the sequence prediction process is carried out using a machine learning model trained using a set of training sequences and a set of corresponding target sequences;
each training sequence comprises a set of data elements indicating position information of each of players and of a ball at respective successive time steps during a rally of a tennis match; and
each target sequence comprises a set of data elements each indicating whether a predetermined one of the players won the rally.

36. A data processing apparatus according to clause 34 or 35, wherein the predetermined player is a serving player or a receiving player.

37. A data processing apparatus according to any one of clauses 29 to 36, wherein the one or more input data elements indicate position information of the one or more objects determined based on user input.

38. A data processing method comprising:
receiving a sequence of one or more input data elements, the one or more input data elements indicating position information of one or more objects in a sports event at respective successive time steps; and
performing a sequence prediction process using the sequence of one or more input data elements to predict a predicted data element, the predicted data element indicating a probability of a predetermined outcome in the sports event.

39. A program for controlling a computer to perform a method according to clause 28 or 38.

40. A computer-readable storage medium storing a program according to clause 39.

Numerous modifications and variations of the present disclosure are possible in light of the above teachings. It is therefore to be understood that, within the scope of the claims, the disclosure may be practiced otherwise than as specifically described herein.

In so far as embodiments of the disclosure have been described as being implemented, at least in part, by one or more software-controlled information processing apparatuses, it will be appreciated that a machine-readable medium (in particular, a non-transitory machine-readable medium) carrying such software, such as an optical disk, a magnetic disk, semiconductor memory or the like, is also considered to represent an embodiment of the present disclosure. In particular, the present disclosure should be understood to include a non-transitory storage medium comprising code components which cause a computer to perform any of the disclosed method(s).

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more computer processors (e.g. data processors and/or digital signal processors). The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to these embodiments. Additionally, although a feature may appear to be described in connection with particular embodiments, one skilled in the art would recognize that various features of the described embodiments may be combined in any manner suitable to implement the present disclosure.

What is claimed is:

1. A data processing apparatus comprising circuitry configured to:

receive a sequence of one or more input data elements, the one or more input data elements indicating position information of one or more objects in a sports event at respective successive time steps;

perform, using a first machine learning model, a sequence prediction process using the sequence of one or more input data elements to predict a first predicted data element at a first future time step in a first period of play of the sports event, the first predicted data element indicating predicted position information of the one or more objects at the first future time step;

determine whether a break event associated with a break in the sports event is predicted to occur, a break event indicating an end of the first period of play;

if a break event is not predicted to occur, continue performing the sequence prediction process using at least the first predicted data element to predict a second predicted data element at a second future time step in the first period of play, the second predicted data element indicating predicted position information of the one or more objects at the second future time step; and if a break event is predicted to occur:

end the sequence prediction process;

use at least the first predicted data element to predict, using a second machine learning model that is different from the first machine learning model, a third predicted data element, the third predicted data element indicating predicted position information of the one or more objects at a start of a second period of play of the sports event; and restart, using the first machine learning model, the sequence prediction process for the second period of play using the third predicted data element.

2. The data processing apparatus according to claim 1, wherein the position information comprises one or more of an absolute position of each of the one or more objects and a change in position of each of the one or more objects with respect to a previous time step.

3. The data processing apparatus according to claim 1, wherein the one or more objects comprise one or more participants of the sports event and a ball.

4. The data processing apparatus according to claim 3, wherein the position information comprises a distance of each of the one or more participants from the ball.

5. The data processing apparatus according to claim 1, wherein each data element comprises a sub-element for each object indicating the position information of the object and a sub-element indicating a type of event which occurs in the sports event.

6. The data processing apparatus according to claim 5, wherein the circuitry is configured to classify each data element to determine whether the indicated type of event is a break event.

7. The data processing apparatus according to claim 5, wherein the one or more objects comprise a participant of the sports event and the sub-element for the participant indicates at least one of an identity of the participant and an identity of a team of the participant.

8. The data processing apparatus according to claim 5, wherein the sub-elements of each of the predicted data elements are predicted using only data elements of one or more previous time steps.

9. The data processing apparatus according to claim 5, wherein at least one sub-element of each of the predicted data elements is predicted using at least one already-predicted sub-element at a current time step.

10. The data processing apparatus according to claim 1, wherein the sports event is a soccer match and the break event is a goal, corner kick, goal kick, throw in, free kick, penalty kick or offside call.

11. The data processing apparatus according to claim 1, wherein the sports event is a tennis match and the break event is a shot classified as a winner or an error.

12. A data processing method comprising:

receiving a sequence of one or more input data elements, the one or more input data elements indicating position information of one or more objects in a sports event at respective successive time steps;

performing, using a first machine learning model, a sequence prediction process using the sequence of one or more input data elements to predict a first predicted data element at a first future time step in a first period of play of the sports event, the first predicted data element indicating predicted position information of the one or more objects at the first future time step;

determining whether a break event associated with a break in the sports event is predicted to occur, a break event indicating an end of the first period of play;

if a break event is not predicted to occur, continue performing the sequence prediction process using at least the first predicted data element to predict a second predicted data element at a second future time step in the first period of play, the second predicted data element indicating predicted position information of the one or more objects at the second future time step; and if a break event is predicted to occur:

ending the sequence prediction process;

using at least the first predicted data element to predict, using a second machine learning model that is different from the first machine learning model, a third predicted data element, the third predicted data element indicating predicted position information of the one or more objects at a start of a second period of play of the sports event; and restarting, using the first machine learning model, the sequence prediction process for the second period of play using the third predicted data element.

13. A non-transitory computer-readable storage medium storing a program according to claim 12.

* * * * *